United States Patent
Fu et al.

(10) Patent No.: US 11,039,196 B2
(45) Date of Patent: Jun. 15, 2021

(54) METHOD AND DEVICE FOR DISPLAYING A SCREEN SHOT

(71) Applicant: Hisense Visual Technology Co., Ltd., Qingdao (CN)

(72) Inventors: Yansong Fu, Qingdao (CN); Hu Song, Qingdao (CN); Shanjuan Bao, Qingdao (CN); Youping Fu, Qingdao (CN); Yuqian Li, Qingdao (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 16/530,233

(22) Filed: Aug. 2, 2019

(65) Prior Publication Data

US 2020/0106984 A1    Apr. 2, 2020

Related U.S. Application Data

(63) Continuation of application No. PCT/CN2019/098446, filed on Jul. 30, 2019.

(30) Foreign Application Priority Data

Sep. 27, 2018 (CN) .......................... 201811132364.X
Sep. 27, 2018 (CN) .......................... 201811133159.5
Mar. 15, 2019 (CN) .......................... 201910199952.3

(51) Int. Cl.
*G06K 9/00* (2006.01)
*H04N 21/422* (2011.01)

(52) U.S. Cl.
CPC ... *H04N 21/42204* (2013.01); *G06K 9/00624* (2013.01)

(58) Field of Classification Search
None
See application file for complete search history.

(56) References Cited

U.S. PATENT DOCUMENTS

| 7,231,419 B1 | 6/2007 | Gheorghe et al. |
| 9,635,195 B1 | 4/2017 | Kachkova et al. |

(Continued)

FOREIGN PATENT DOCUMENTS

| CN | 101535927 A | 9/2009 |
| CN | 101853299 A | 10/2010 |

(Continued)

OTHER PUBLICATIONS

International Search Report from corresponding international application No. PCT/CN2019/099631, 7 pgs., dated Nov. 13, 2019.

(Continued)

*Primary Examiner* — Mulugeta Mengesha
*Assistant Examiner* — Charles N Hicks
(74) *Attorney, Agent, or Firm* — Brinks Gilson & Lione

(57) ABSTRACT

A method for displaying a screen shot, and a display device are provided. The method includes receiving a first input instruction from a remote controller for obtaining a screen shot of a display screen of the display device while a display content is being displayed on the display screen; in response to the first input instruction, capturing a screen shot of the display screen; automatically determining one or more recognized objects in the screen shot; receiving a second input instruction from the remote controller; and in response to the second input instruction: displaying the screen shot on the display screen in a first display layer; displaying one or more object recognition frames for identifying the one or more recognized objects of the screen shot in a second display layer; and displaying, in the second display layer over the first display layer, a focus frame over a first object recognition frame among the one or more object recognition frames corresponding to a first recognized object among the one or more recognized objects based on a user selection requested from the remote controller.

15 Claims, 32 Drawing Sheets

(56) References Cited

U.S. PATENT DOCUMENTS

| | | | | |
|---|---|---|---|---|
| 2005/0097479 | A1* | 5/2005 | Takabe | H04N 21/4782 |
| | | | | 715/851 |
| 2006/0044446 | A1* | 3/2006 | Porter | H04N 21/23418 |
| | | | | 348/333.11 |
| 2008/0066135 | A1 | 3/2008 | Brodersen et al. | |
| 2008/0109851 | A1* | 5/2008 | Heather | H04N 21/858 |
| | | | | 725/60 |
| 2011/0282906 | A1* | 11/2011 | Wong | G06F 16/7867 |
| | | | | 707/780 |
| 2012/0023131 | A1* | 1/2012 | Downey | G06F 16/48 |
| | | | | 707/769 |
| 2013/0198766 | A1* | 8/2013 | Yoon | H04N 21/47 |
| | | | | 725/12 |
| 2014/0095626 | A1* | 4/2014 | Hsi | G06F 16/583 |
| | | | | 709/205 |
| 2015/0078726 | A1* | 3/2015 | Shakib | G06F 16/48 |
| | | | | 386/225 |
| 2015/0169166 | A1* | 6/2015 | Kim | G06T 3/40 |
| | | | | 715/838 |
| 2015/0268822 | A1* | 9/2015 | Waggoner | G06F 3/167 |
| | | | | 715/722 |
| 2016/0299911 | A1 | 10/2016 | Grigoreva et al. | |
| 2017/0289643 | A1 | 10/2017 | Kachkova et al. | |
| 2019/0354601 | A1 | 11/2019 | dePaz et al. | |
| 2019/0354603 | A1 | 11/2019 | Selim et al. | |
| 2019/0354608 | A1 | 11/2019 | dePaz et al. | |
| 2019/0356949 | A1 | 11/2019 | dePaz et al. | |
| 2019/0356951 | A1 | 11/2019 | Selim et al. | |
| 2019/0356952 | A1 | 11/2019 | Leung et al. | |
| 2020/0275048 | A1 | 8/2020 | Fu et al. | |
| 2020/0322689 | A1* | 10/2020 | Gao | H04N 21/4532 |

FOREIGN PATENT DOCUMENTS

| | | |
|---|---|---|
| CN | 102938861 A | 2/2013 |
| CN | 103186538 A | 7/2013 |
| CN | 103198424 A | 7/2013 |
| CN | 103248943 A | 8/2013 |
| CN | 103428571 A | 12/2013 |
| CN | 103647989 A | 3/2014 |
| CN | 103828388 A | 5/2014 |
| CN | 104572804 A | 4/2015 |
| CN | 104699800 A | 6/2015 |
| CN | 104881287 A | 9/2015 |
| CN | 105373552 A | 3/2016 |
| CN | 105792010 A | 7/2016 |
| CN | 105959740 A | 9/2016 |
| CN | 105979382 A | 9/2016 |
| CN | 106294770 A | 1/2017 |
| CN | 106604089 A | 4/2017 |
| CN | 106708823 A | 5/2017 |
| CN | 106921876 A | 7/2017 |
| CN | 107105340 A | 8/2017 |
| CN | 107315844 A | 11/2017 |
| CN | 107371066 A | 11/2017 |
| CN | 107480236 A | 12/2017 |
| CN | 107888985 A | 4/2018 |
| CN | 108055589 A | 5/2018 |
| CN | 108156522 A | 6/2018 |
| CN | 108259973 A | 7/2018 |
| CN | 108289236 A | 7/2018 |
| CN | 108322806 A | 7/2018 |
| CN | 108416018 A | 8/2018 |
| CN | 109168069 A | 1/2019 |
| CN | 109271983 A | 1/2019 |
| CN | 109388461 A | 2/2019 |
| CN | 109922363 A | 6/2019 |
| EP | 3 188 107 A1 | 7/2017 |
| WO | WO 2019/119800 A1 | 6/2019 |
| WO | WO 2019/120008 A1 | 6/2019 |

OTHER PUBLICATIONS

International Search Report from corresponding international application No. PCT/CN2019/098446, 7 pgs., dated Nov. 1, 2019.
First Office Action dated Feb. 28, 2019 for Chinese Patent Application No. 2017 11381674.0.
Second Office Action dated Sep. 4, 2019 for Chinese Patent Application No. 2017 11381674.0.
Third Office Action dated Mar. 4, 2020 for Chinese Patent Application No. 2017 11381674.0.
Fourth Office Action dated Sep. 2, 2020 for Chinese Patent Application No. 2017 11381674.0.
First Office Action dated Jul. 2, 2020 for Chinese Patent Application No. 2018 11244228.X.
First Office Action dated Apr. 23, 2019 for Chinese Patent Application No. 2018 10141968.4.
First Office Action dated Apr. 23, 2019 for Chinese Patent Application No. 2018 10141949.1.
Second Office Action dated Jan. 9, 2020 for Chinese Patent Application No. 2018 10141968.4.
First Office Action dated Apr. 23, 2019 for Chinese Patent Application No. 2018 10141211.5.
Second Office Action dated Jan. 9, 2020 for Chinese Patent Application No. 2018 10141211.5.
Extended European Search Report dated Aug. 25, 2020 for European Application No. 18892605.9.
International Search Report dated Feb. 14, 2019 for International Application No. PCT/CN2018/115482.
International Search Report dated Oct. 11, 2018 for International Application No. PCT/CN2018/096528.

* cited by examiner

METHOD AND DEVICE FOR DISPLAYING A SCREEN SHOT

CROSS-REFERENCE TO RELATED APPLICATIONS

This application is a continuation of International Application No. PCT/CN2019/098446, filed on Jul. 30, 2019, which claims the benefits of Chinese Patent Application No. 201811133159.5, filed with the Chinese Patent Office on Sep. 27, 2018, and entitled "A method and apparatus for displaying a recognized object in a screen shot, and a display terminal", Chinese Patent Application No. 201811132364.X, filed with the Chinese Patent Office on Sep. 27, 2018, and entitled "A method for displaying a recognized object in a screen shot, and a display terminal", and Chinese Patent Application No. 201910199952.3, filed with the Chinese Patent Office on Mar. 15, 2019, and entitled "A method for displaying a graphic user interface of a screen shot, and a display device", all of which are hereby incorporated by reference in their entireties.

TECHNICAL FIELD

The present application relates to smart TV sets, and particularly to a method and device for interactively displaying a screen shot.

BACKGROUND

For smart TVs controlled by remote controls (or remote controllers), objects may be automatically recognized in the display interface. A particular recognized object may be selected by a user. The selection of the recognized object and feedback information about the selected object may need to be visually presented to the user in an interactive manner.

SUMMARY

Embodiments of the application provide a method for displaying a screen shot, and a display device so as to provide a user with a visualized focus frame marking (alternatively referred as identifying) or identifying a recognized object in the screen shot, and real-time operational and interactive feedback.

Some embodiments of the application provide a method for displaying a screen shot of a display device, the method including: receiving an input instruction for obtaining a screen shot of a display image of the display device, sent from a remote controller; in response to the input instruction for obtaining the screen shot of the display image of the display device, displaying the display image in a first area of a display interface of the display device, displaying the screen shot in a second area of the display interface, determining recognized objects in the screen shot, and arranging the recognized objects in order according to corresponding positional information of the recognized objects in the screen shot, in a third area of the display interface, where object recognition frames are presented overlaying around the recognized objects; receiving a selection instruction for indicating selecting one of the recognized objects using a focus frame, sent from the remote controller; and in response to the selection instruction, displaying the focus frame overlaying the object recognition frame corresponding to the selected recognized object.

In some embodiments, the display interface includes a plurality of layers, the screen shot of the display image is displayed at a first layer, and the object recognition frames corresponding to the recognized objects are displayed at a second layer, where the second layer is arranged upon the first layer.

In some embodiments, a first object recognition frame is presented overlaying around a first recognizable object of the display image, and a magnified image of the first recognizable object is presented at a predetermined distance from the first object recognition frame.

In some embodiments, the second area is adjacent to the third area.

In some embodiments, the method further includes: receiving a first instruction for operation on the screen shot sent from the remote controller; and in response to the first instruction, presenting two-dimension barcode information associated with the screen shot on the display interface so that a user obtains the screen shot by scanning the two-dimension barcode information.

In some embodiments, the two-dimension barcode information is plotted at a third layer arranged upon the second layer.

In some embodiments, the method further includes: receiving a key event sent from the remote controller, and dispatching the key event to one of the first layer, the second layer, and the third layer, to enable a selected layer respond to the key event.

In some embodiments, the method further includes: receiving a second instruction for operation on the screen shot sent from the remote controller; and in response to the second instruction, causing the third layer to fade out of the display interface.

In some embodiments, the method further includes: traversing central coordinates of other recognized objects, and calculating differences in horizontal coordinate or vertical coordinate between central coordinates of the other recognized objects and a central coordinate of the selected recognized object; and selecting a second recognizable object with least difference among the other recognized objects as one for next focus frame plotting.

In some embodiments, the method further includes: in response to the difference in horizontal coordinate or vertical coordinate of a third recognized objects being equal to that of a fourth recognized object, calculating distances between the central coordinates of the third and fourth recognized objects, and the central coordinate of the selected recognized object according to the Pythagorean Theorem, and selecting a recognized object with a shorter distance as one for a next focus frame plotting.

Some embodiments of the application provide a display device including: a display screen configured to present an image; a memory configured to store computer instructions, and image data associated with the display screen; and a processor in communication with the display screen and the memory, and configured to execute the computer instruction to enable the display device to: receive an input instruction for obtaining a screen shot of a display image of the display device, sent from a remote controller; in response to the input instruction for obtaining the screen shot of the display image of the display device, display the display image in a first area of the display interface of the display device, display the screen shot in a second area of the display interface, determine recognized objects in the screen shot, and arrange the recognized objects in order according to corresponding positional information of the recognized objects in the screen shot, in a third area of the display interface, where object recognition frames are presented overlaying around the recognized objects; receive a selection instruction for indicating selecting one of the recognized objects using a focus frame, sent from the remote controller; and in response to the selection instruction, display the focus frame overlaying the object recognition frame corresponding to the selected recognized object.

Some embodiments of the application provide a computer readable non-transitory storage medium storing computer executable instructions configured to perform the method above upon being executed on a processor.

Some embodiments of the application provide a method for displaying a recognized object body in a screen shot, the method including: obtaining a screen shot of a current display image of a screen, and plotting the screen shot at a first layer; obtaining object recognition information of the screen shot, and plotting object recognition frames at a second layer according to the object recognition information, where the second layer is arranged upon the first layer; and determining a currently selected recognized object in the screen shot, covering the object recognition frame of the currently selected recognized object with a focus frame of the currently selected recognized object, and plotting them at the second layer.

In some embodiments, the object recognition information includes positional information of the objects; and plotting the object recognition frames at the second layer according to the object recognition information includes: filling the object recognition frames into ImageView controls, and plotting the ImageView controls filled with the object recognition frames at the second layer, where the ImageView controls are created according to the positional information of the objects.

In some embodiments, covering the object recognition frame of the currently selected recognized object with the focus frame of the currently selected recognized object, and plotting them at the second layer includes: filling the focus frame of the currently selected recognized object into an ImageView control, and plotting the ImageView control filled with the focus frame at the second layer while covering the object recognition frame of the currently selected recognized object therewith, where the ImageView control is created according to the positional information of the currently selected recognized object.

In some embodiments, a focus frame previously plotted at the second layer is deleted while plotting the focus frame of the currently selected recognized object at the second layer.

In some embodiments, the method further includes: plotting a two-dimension barcode for sharing the screen shot at a third layer overlaying the second layer, where the third layer is arranged upon the second layer.

In some embodiments, the method further includes: controlling the third layer to be displayed or hidden, in response to an instruction input from a user through a remote controller.

In some embodiments, the method further includes: traversing central coordinates of the other recognized object bodies, and calculating differences in horizontal coordinate or vertical coordinate between the central coordinates of the other recognized object bodies and central coordinates of the currently selected recognized object; selecting a recognized object body with least difference among the other recognized object body as one for next focus frame plotting; and when there are recognized object bodies with the same difference, calculating the distances between the recognized object bodies with the same difference, and the central coordinate of the currently selected recognized object according to the Pythagorean Theorem, and selecting the recognized object body with the shortest distance as one for next focus frame plotting.

Some embodiments of the application further provide a display device including: a memory configured to store program instructions; and a processor configured to invoke the program instructions stored in the memory, and to execute the program instructions to perform the method according to the embodiment above of the application.

Another embodiment of the application provides a computer readable non-transitory storage medium storing computer executable instructions configured to perform the method above upon being executed on a processor.

Some embodiments of the application provide a method for displaying a recognized object body in a screen shot, the method including: receiving an input instruction for obtaining a screen shot of a current image, while the current image is being displayed on a screen; in response to the input instruction, displaying the screen shot of the current image on the screen, and displaying an object recognition frame corresponding to at least one recognized object body in the screen shot on the screen based upon positional information of the recognized object body; receiving an input instruction for indicating moving a focus frame between the at least one recognized object body; and in response to the input instruction, displaying the object recognition frame corresponding to a selected recognized object body as the focus frame while distinguishing it from the other object recognition frames.

In some embodiments, the screen shot of the current image is displayed at a first layer on the screen, and the object recognition frames corresponding to the recognized object bodies in the screen shot are displayed at a second layer on the screen, where the second layer is arranged upon the first layer.

In some embodiments, the positional information of the recognized object bodies indicates the display positions and sizes, of the object recognition frames corresponding to the recognized object bodies, in the screen shot.

In some embodiments, when the object recognition frames are rectangular frames, the positional information of the recognized object bodies includes at least coordinate information of any one corner of the rectangular frames corresponding to contours of the recognized object bodies, and the widths and the heights of the rectangular frames.

In some embodiments, after the object recognition frame corresponding to the recognized object body to be selected is displayed as the focus frame while being distinguished from the other object recognition frames, the method further includes: receiving an input instruction for confirming the selection of the selected recognized object body; and in response to the input instruction, displaying recognition contents and related recommended contents of the selected recognized object body on the screen.

Some embodiments of the application provide a method for displaying a recognized object in a screen shot, the method including: receiving an input instruction to for obtaining a screen shot of the current image, while the current image is being displayed on a screen; in response to the input instruction, displaying the screen shot of the current image on the display screen, and displaying an object recognition frame corresponding to at least one recognized object body in the screen shot on the display screen based upon positional information of the recognized object body; receiving an input instruction for indicating moving a focus frame between the at least one recognized object body; and in response to the input instruction, displaying the overlaying focus frame on the object recognition frame corresponding to a selected recognized object body.

In some embodiments, the screen shot of the current image is displayed at a first layer on the screen, and the object recognition frame corresponding to the recognized object body in the screen shot, and the focus frame of the selected recognized object body are displayed at a second layer on the screen, where the second layer is arranged upon the first layer.

In some embodiments, the display position and size of the focus frame of the selected recognized object body are determined according to the positional information of the selected recognized object body so that the focus frame coincides with the object recognition frame.

In some embodiments, the positional information of the recognized object body includes at least coordinate information of any one corner of a rectangular frame corresponding to a contour of the recognized object body.

In some embodiments, the method further includes: receiving an input instruction for moving the focus frame from the currently selected recognized object body to another recognized object body; and in response to the input instruction, comparing the abscissa or ordinate differences between coordinate information of any one corner of the rectangular frame corresponding to the contour of the currently selected recognized object body, and coordinate information of any one corners of the rectangular frames corresponding to the contours of the other recognized object bodies, and displaying the focus frame on the object recognition frame corresponding to the other recognized object body with the least difference.

Some embodiments of the application provide a display device including: a screen; a memory; and a processor, in communication with the memory and the screen, and configured to perform the method according to the embodiment above of the application.

Some embodiments of the application provide a method for displaying a graphic user interface of a screen shot, the method including: displaying the current image on a display; in response to an input instruction for obtaining a screen shot of the current image, displaying a screen shot image of the current image on the display, and displaying an object recognition frame for identifying at least one recognized object in the screen shot image on the display based upon positional information of the recognized object; and in response to an input instruction for moving a selector between at least one object recognition frame, displaying the selector at the object recognition frame of one of the recognized objects, and magnifying and displaying an image of the selected recognized object upon determining that the size of the object recognition frame of the selected recognized object is below a preset threshold.

Some embodiments of the application provide a display device including: a user interface configured to receive a user input instruction; a display configured to display a graphic user interface and a selector, where the position of the selector on the display is moved in response to the user input instruction; a controller configured to control the display to display the graphic user interface in response to the input instruction via the user interface, where the controller is configured to: in response to an input instruction for obtaining a screen shot of the current image on the display, display a screen shot image of the current image on the display, and display an object recognition frame for identifying at least one recognized object in the screen shot image on the display based upon positional information of the recognized object; and in respond to an input instruction for moving the selector between at least one object recognition frame, display the selector at the object recognition frame of one of the recognized objects, and magnify and display an image of the selected recognized object upon determining that the size of the object recognition frame of the selected recognized object is below a preset threshold.

BRIEF DESCRIPTION OF THE DRAWINGS

In order to fully describe the technical solutions according to the embodiments of the application, drawings to which reference is to be made in the description of the embodiments are briefly introduced below. The drawings are merely examples, and those having ordinary skill in the art can further derive other drawings from these drawings without any inventive effort.

DETAILED DESCRIPTION OF THE EMBODIMENTS

The technical schemes according to some embodiments of the application will be described below with reference to the drawings in the embodiments of the application. The embodiments to be described below are only examples. Based upon those embodiments, other embodiments which can be derived by those having ordinarily skill in the art without any inventive effort shall fall within the scope of this application.

Some embodiments of the application provide a method for displaying a recognized object in a screen shot so as to provide a user with a visualization focus state with real-time operational and interactive feedback, to thereby satisfy a user's interactive needs, reduce the amount of calculation and reduce consumption of a memory.

Embodiments of the application will be described below in details with reference to the drawings. It shall be noted that the order in which the embodiments of the application are presented only represents an order in which they are described, but shall not suggest any superiority or inferiority of one embodiment to another.

Figure 1:
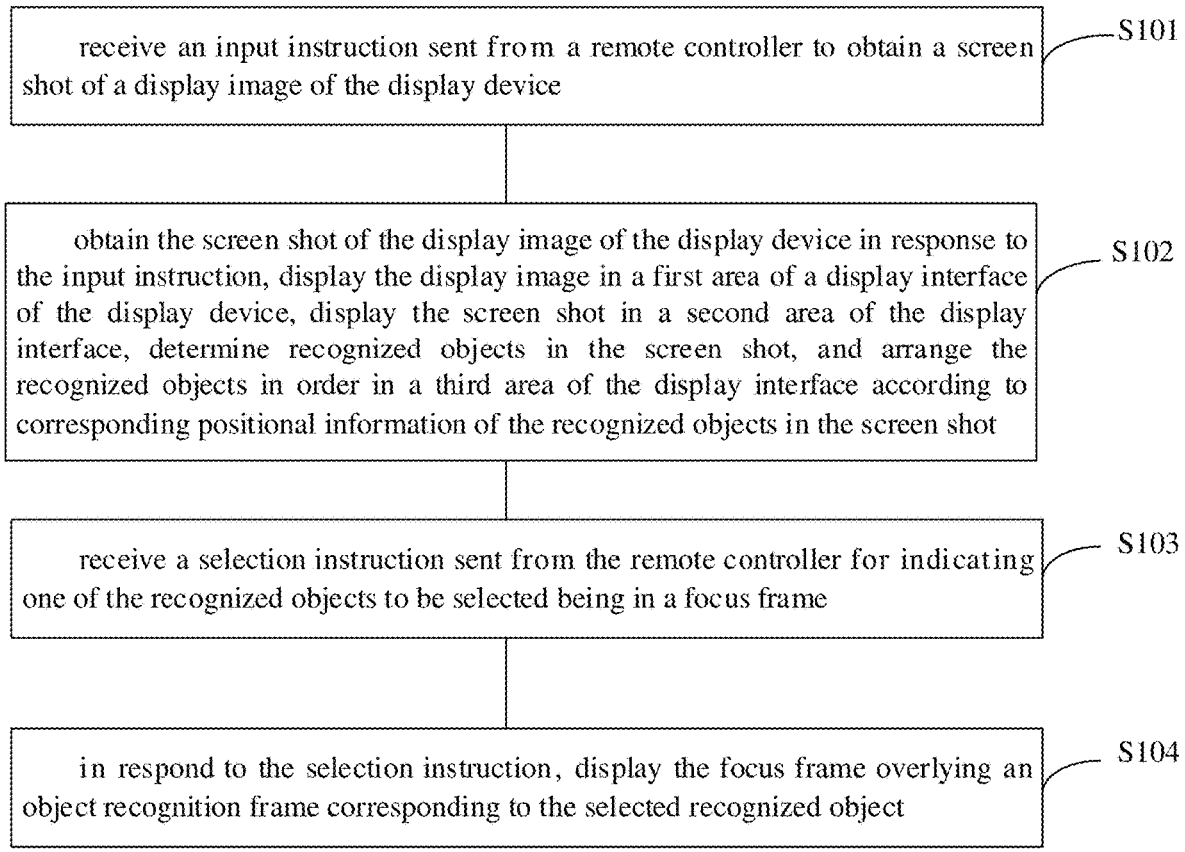
FIG. 1 is a flow chart of a method for displaying a screen shot in a display device according to some embodiments of the application.

As illustrated in FIG. 1, a method for displaying a screen shot of a display device according to some embodiments of the application includes the following operations S101 to S104.

The operation S101 is to receive an input instruction sent from a remote controller to obtain a screen shot of a display image (alternatively referred to as display screen or display content) of the display device.

The operation S102 is to obtain the screen shot of the display image of the display device in response to the input instruction, to continue displaying the display image in a first area of a display interface of the display device, to display the screen shot in a second area of the display interface, to determine recognized objects in the screen shot, and to arrange the recognized objects in a third area of the display interface in order of corresponding positional information of the recognized objects in the screen shot, where object frames are presented to mark, identify, or demarcate the recognized objects.

The operation S103 is to receive a selection instruction, sent from the remote controller, for indicating one of the recognized objects to be selected being in a focus frame.

The operation S104 is to display the focus frame overlaying an object frame among the object frames corresponding to the selected recognized object in response to the selection instruction.

The recognized object may be an object, e.g., a human figure, an item, etc., in the display image of the display device.

Figure 3A:
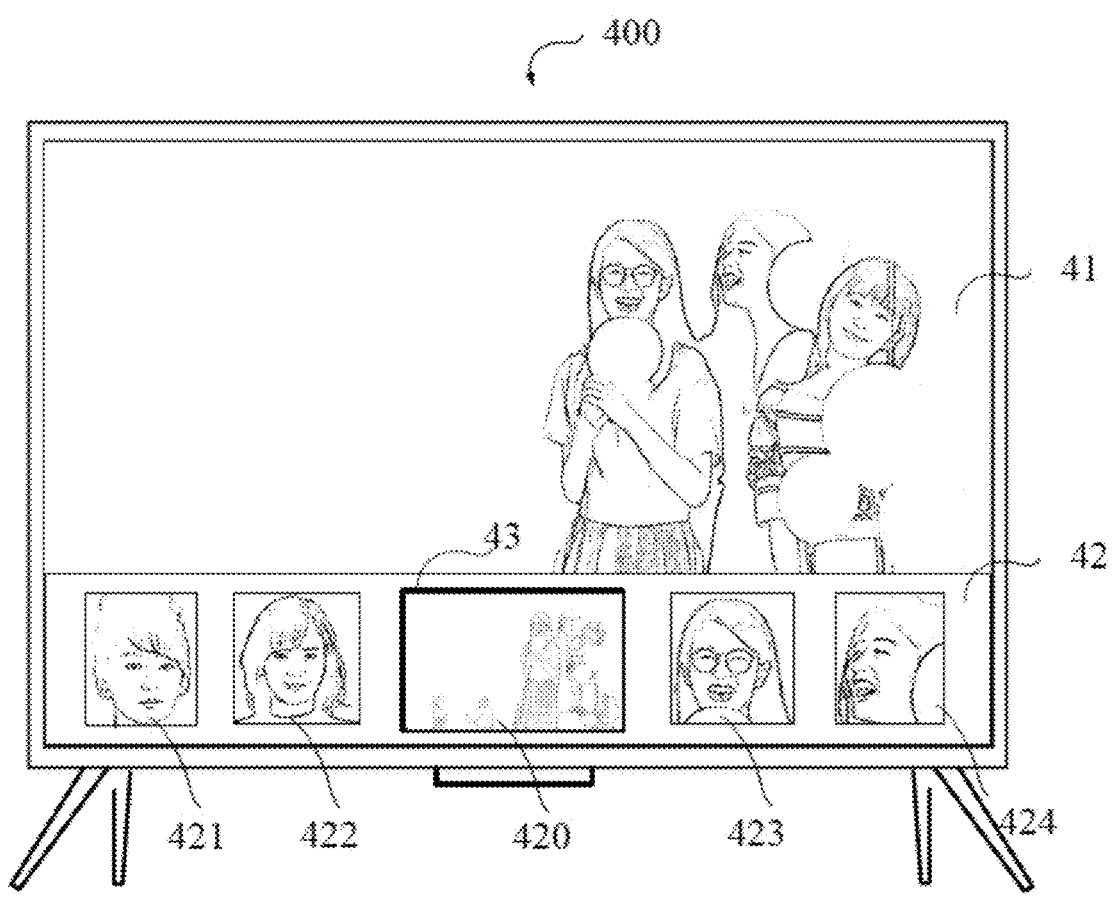
FIG. 3A illustrates a schematic diagram of a GUI 400 on the display device.
Figure 12:
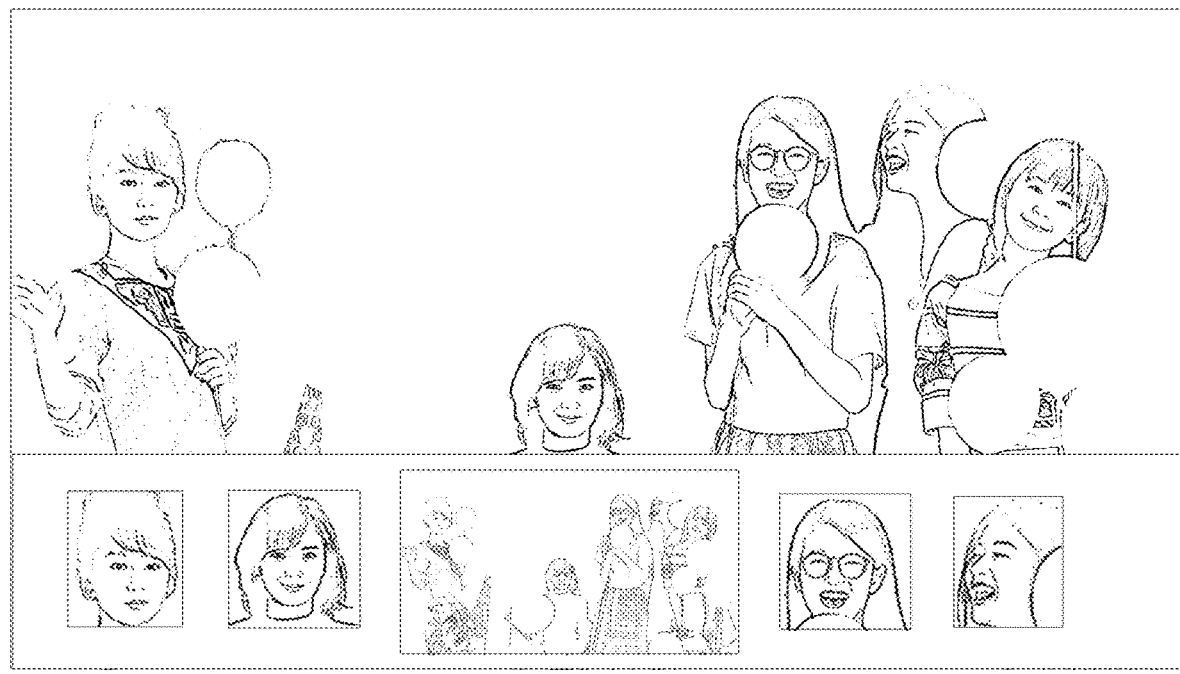
FIG. 12 illustrates a display interface as part of an interaction flow of an example of the solution according to some embodiments of the application.

For example, as illustrated in FIG. 3A, the first area is an area where a currently displayed image 41 is presented, the second area is an area where a screen shot image 420 is presented, and the third area is an area where graphic elements 421, 422, 423, and 424 are presented. For example, as illustrated in FIG. 12, an upper area is regarded as the first area, and a lower area includes the second area and the third area.

In some embodiments, the display interface includes a plurality of layers, where a screen shot of the display image is displayed in a first layer, and one or more object recognition frames corresponding to one or more recognized objects are displayed in a second layer, where the second layer is located over the first layer.

Figure 3B:
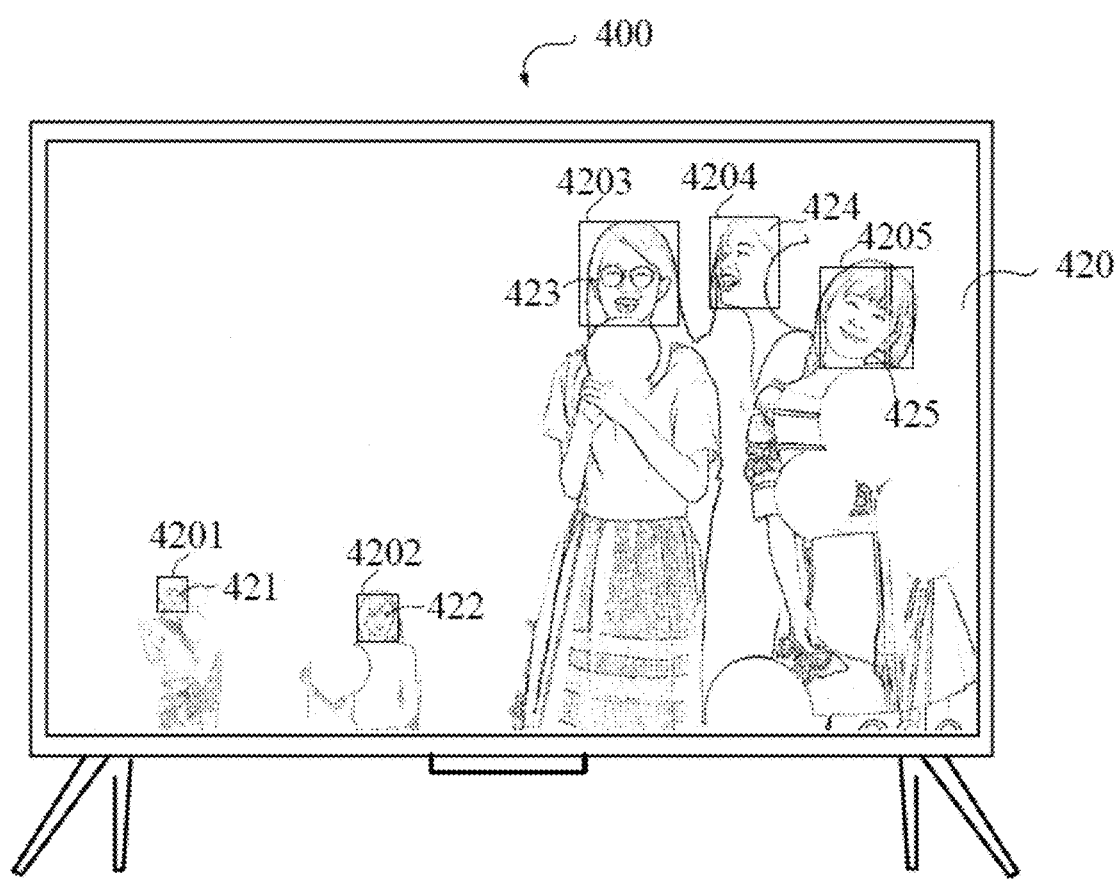
FIG. 3B illustrates a schematic diagram of a GUI 400 on the display device.
Figure 3C:
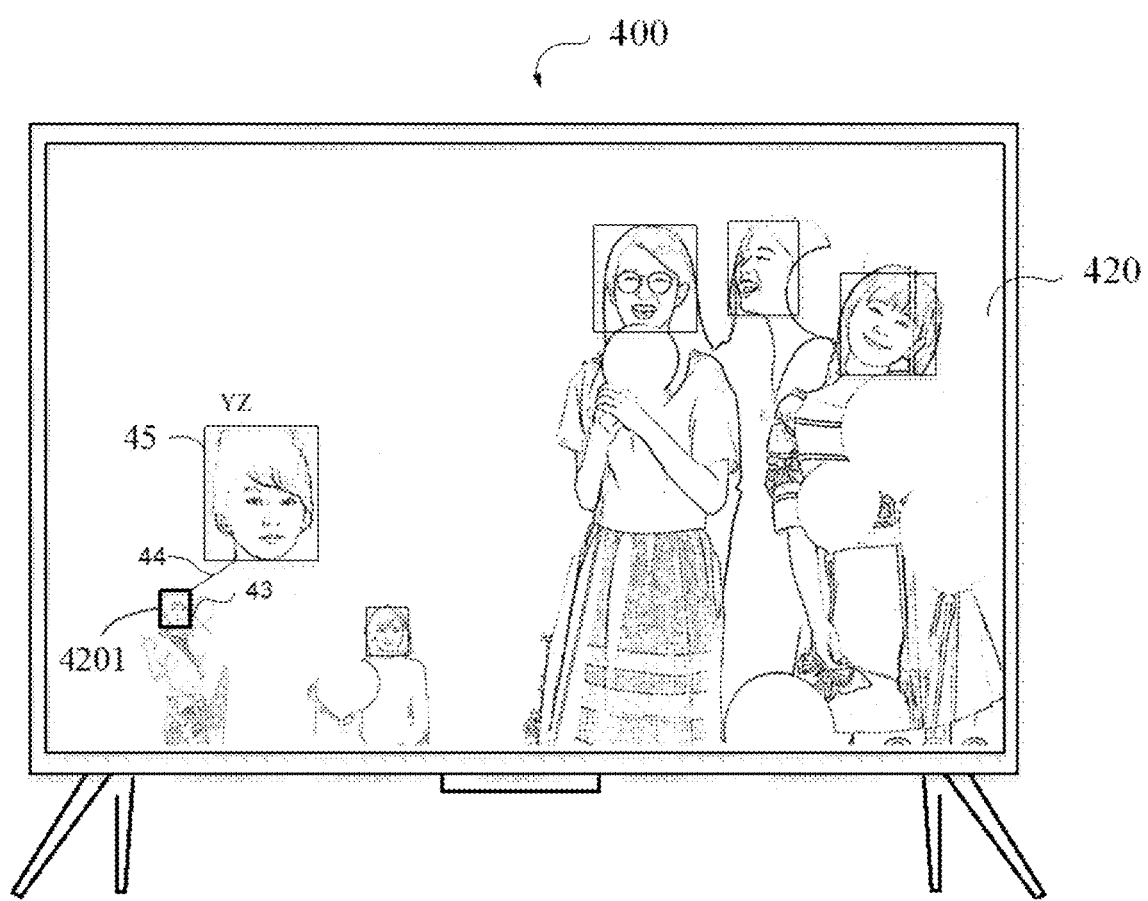
FIG. 3C illustrates a schematic diagram of a GUI 400 on the display device.

In some embodiments, a first object recognition frame is presented marking or demarcating around a first recognized object of the display image, and a magnified image of the first recognized object, e.g., 45 in FIG. 3C, is presented at a predetermined distance from the first object recognition frame.

In some embodiments, the second area is adjacent to the third area, e.g., as illustrated in FIG. 3A showing that the second area including the screen shot image 420 is adjacent to the third area including the graphic elements 422 and 423.

Figure 13:
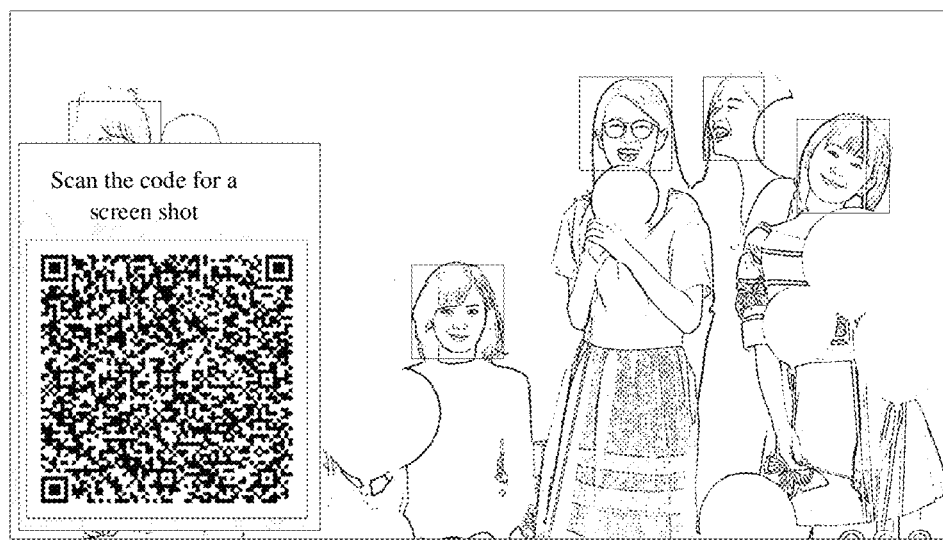
FIG. 13 illustrates a display interface as part of an interaction flow of an example of the solution according to some embodiments of the application.

In some embodiments, a first operation instruction, sent by the remote controller, for taking a screen shot is received; and two-dimension barcode information associated with the screen shot is presented on the display interface in response to the first operation instruction, so that a user obtains the screen shot by scanning the two-dimension barcode information, e.g., a two-dimension barcode information on the left of FIG. 13.

In some embodiments, during the presentation of the two-dimension barcode information corresponding to the screen shot, the display interface may be updated. In the updated display interface, the image which is originally presented in the first area is presented, while the images originally presented in the second area and the third area are hidden. The object recognition frames are presented around the recognized objects of the presented images, e.g., object recognition frames plotted around heads of characters on the right of FIG. 13. The object recognition frames are located in the second layer on top of the first layer including the screen shot. The object recognition frames around heads of characters on the right of FIG. 13 are presented by causing the first layer overlap with the second layer.

In some embodiments, the two-dimension barcode information is plotted in a third layer on top of the second layer where the object recognition frames are located.

In some embodiments, upon receiving a signal for indicating a key event from the remote controller the key event is dispatched to one of the first layer, the second layer, or the third layer in response.

In some embodiments, upon receiving a second operation instruction, sent from the remote controller associated with the screen shot, the third layer is hidden in response to the second operation instruction. For example, the third layer gradually fades out of the interface in response to the second operation instruction. That is, the display interface is updated, and the two-dimension barcode information is not visible on the display interface.

In some embodiments, the method according to some embodiments of the application further includes: determining differences in horizontal coordinates and vertical coordinates between the central coordinate of the selected recognized object and the central coordinates of other recognized objects; and a second recognized object with the least difference in horizontal coordinates or vertical coordinates is selected as a next focus frame plotting position.

In some embodiments, the next selected recognized object is selected in a manner as described above. For example, another recognized object within the shortest distance from the selected recognized object currently in the focus frame is determined as the next selected recognized object.

In other embodiments, the next selected recognized object is alternatively determined in other ways. For example, the next selected recognized object may be selected using a directional key or another button on the remote controller.

In some embodiments, in response to more than one recognized objects having the same difference in horizontal coordinates or vertical coordinates, that is, there are two recognized objects having the same distance from the currently selected recognized object, the distances between the central coordinates of the two recognized objects and the central coordinate of the selected recognized object are calculated according to the Pythagorean Theorem, and one of the two recognized objects with a shorter distance is selected as one for the next focus frame plotting.

Figure 2:
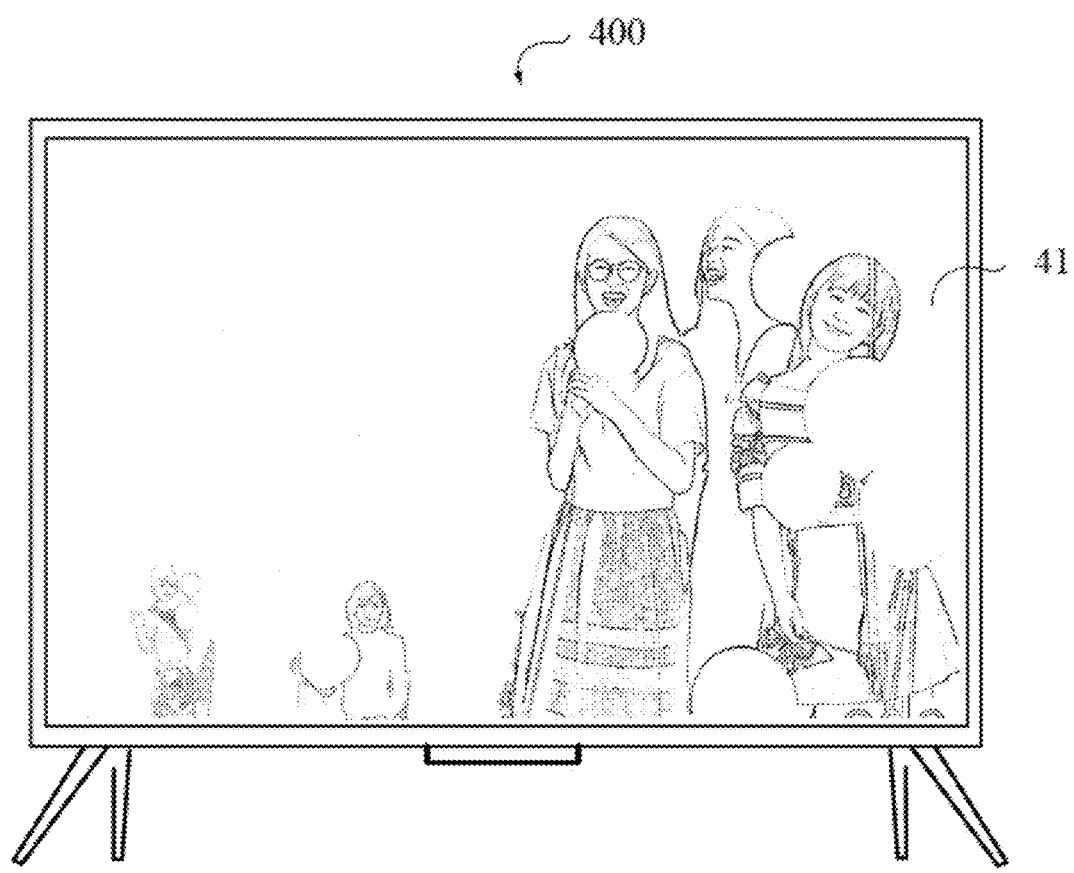
FIG. 2 illustrates a schematic diagram of a display image of a display device.

FIG. 2 illustrates a schematic diagram of a display image of a display device.

As illustrated in FIG. 2, the display device provides a currently played image 41 to the display, including at least one of a text, an image, and a video. For example, the currently played image 41 illustrated in FIG. 2 includes a segment of a TV series (alternatively referred to as TV video image sequence).

In FIG. 2, while a segment of a TV series is being played on the display device, a user may want to know the characters' related information, clothing information, channel information, etc., in the currently played image 41, so the user can press a preset key (e.g., a key for screen shot) on a control device. The display device obtains a screen shot of the currently played image 41, and transmits the screen shot image to an image recognition server for content recognition in response to an instruction for screen shot triggered by the preset key, so that the image recognition server returns content information of recognized objects in the screen shot image, and recommended contents associated with the recognized objects in categories for user browsing.

In some embodiments, when the image recognition server returns data associated with the recognized objects, the display device can present the returned data in categories according to preset rules. For example, the server for image recognition recognizes five characters in the screen shot image, so the data returned to the display device can include positional information of the five characters in the screen shot image, basic introduction information of the characters, information about other movies and TV series associated with the characters, clothing information of the characters in the screen shot image, etc.

FIG. 3A to FIG. 3L illustrate schematic diagrams of a Graphical User Interface (GUI) 400 of the display device.

As illustrated in FIG. 3A, in response to an instruction for taking a screen shot triggered by a preset key, the display device presents a GUI 400 including the currently played image 41, and a floating presentation area 42 displayed above the currently played image 41 and located below the currently played image 41 in terms of layer layout. The screen shot image 420, the recognized character and clothing information, etc., are displayed in the floating presentation area 42. For example, in the GUI 400 as illustrated in FIG. 3A, the screen shot image 420 is displayed in the middle of the floating presentation area 42, and graphic elements 421 to 424 corresponding to the characters recognized in the screen shot image 420 are displayed respectively on two sides of the screen shot image 420.

Moreover the GUI 400 provided by the display device further includes a selector 43 for indicating a graphic element being selected, where the position of the selector 43 in the display interface can be moved by a user's operation on the control device (e.g., the remote controller) to thereby select one of the respective recognized objects in the display interface so as to present the screen shot image 420, or one of the graphic elements 421, 422, 423, or 424.

For example, in the GUI 400 as illustrated in FIG. 3A, a graphic element of the screen shot image 420, and portraits of the characters in the graphic elements 421 and 422 are displayed in the floating presentation area 42, and the selector 43 indicates that the screen shot image 420 is selected. In another example, in the GUI 400 as illustrated in FIG. 3C, a plurality of object recognition frames are displayed respectively at a plurality of portraits of the characters, and the selector 43 indicates that the object recognition frame 4201 is selected.

In some embodiments, the selector is displayed as a focus frame. In response to an input by the user through the control device, the focus frame displayed on the display device can be controlled to be moved to select or control one of the graphic elements presented on the display interface. For example, the user can control the focus frame to be moved, through a directional key on the control device to select and control one of the graphic elements.

The presentation form of the focus frame is not limited to any particular form. By way of example, the focus frame is presented in a form of bold line as illustrated in FIG. 3A, or the focus frame are alternatively presented in variable size, color, transparency, contour, etc., on the graphic element where the focus lands.

In some embodiments, as illustrated in FIG. 3A and FIG. 3B, when the user operates on the control device, e.g., the user presses a confirm key on the control device, and the selector selects the screen shot image 420, the display device responds to an input instruction to activate the screen shot image 420 and displaying the screen shot image 420 in full screen, and displaying the object recognition frames for identifying the recognized objects, around the respective recognized objects in the screen shot image 420 on the display in full screen, based upon the positional information of the recognized objects in the screen shot image 420, returned by the server for image recognition. For example, in the GUI 400 as illustrated in FIG. 3B, the object recognition frames 4201 to 4205, e.g., rectangular frames, are displayed respectively around the portraits of the recognized characters in five graphic elements 421 to 425. In this way, users are provided with visual annotation of the recognized objects so that the users are provided with not only the recognized objects in the screen shot image directly, but also a prompt for browsing following content information associated with the recognized objects.

In some embodiments, when the user further needs to view the content information surrounded by the object recognition frames presented in the display interface, he or she can press on a direction key on the control device according to the indication of the object recognition frames in the screen shot image, and the display device can move the position of the selector in the GUI in response to the instruction triggered by the direction key to indicate one of the object recognition frames being selected, so that a link associated with the content in object recognition frame is activated, and the content information of the selected recognized object is available for browse.

For example, as illustrated in FIG. 3B and FIG. 3C, when the selector 43 is instructed to select the object recognition frame 4201 corresponding to the graphic element 421 on the very left of the screen shot image 420, the display interface of the display device is updated, and the selector 43 is displayed at the object recognition frame 4201.

In some embodiments, a graphic element corresponding to the character, and the corresponding object recognition frame, both of which are magnified in proportion are alternatively popped up and displayed around the selector. In this way, since the user typically views or operates on the GUI provided by the display device at a long distance, when the size of the character in the screen shot image is so small that it is not easy for the user to view, or the character is too blurred to distinguish, the magnified character is displayed when the size of the character icon in the screen shot image is small so that the user can view the character more clearly at a long distance. The name of the character is also annotated at the magnified object recognition frame according to the name of the character icon returned by the image recognition server so that the user is able to know the name corresponding to the character while viewing the character icon clearly at a long distance.

In some embodiments, a connection line is further displayed between the selector and the magnified character and corresponding object recognition frame thereof to thereby indicate to the user that the magnified character and corresponding object recognition frame thereof belong to the object recognition frame currently selected by the selector, so as to further enable the user to view the character more clearly. For example, in the GUI 400 as illustrated in FIG. 3C, a connection line 44 is shown to connect the selector 43 with the magnified object recognition frame 45.

Here the size and the shape of the selector are the same as those of the object recognition frame corresponding to the character selected by the selector, but the selector is displayed such that it is distinguished from the object recognition frames corresponding to the other character not selected by the selector; and for example, in the GUI 400 as illustrated in FIG. 3C, the frame line of the selector 43 can be displayed in bold, in a different color, etc., so that it is distinguished from the object recognition frames 4201 to indicate to the user that the character selected by the selector 43 is currently of interest.

Figure 3D:
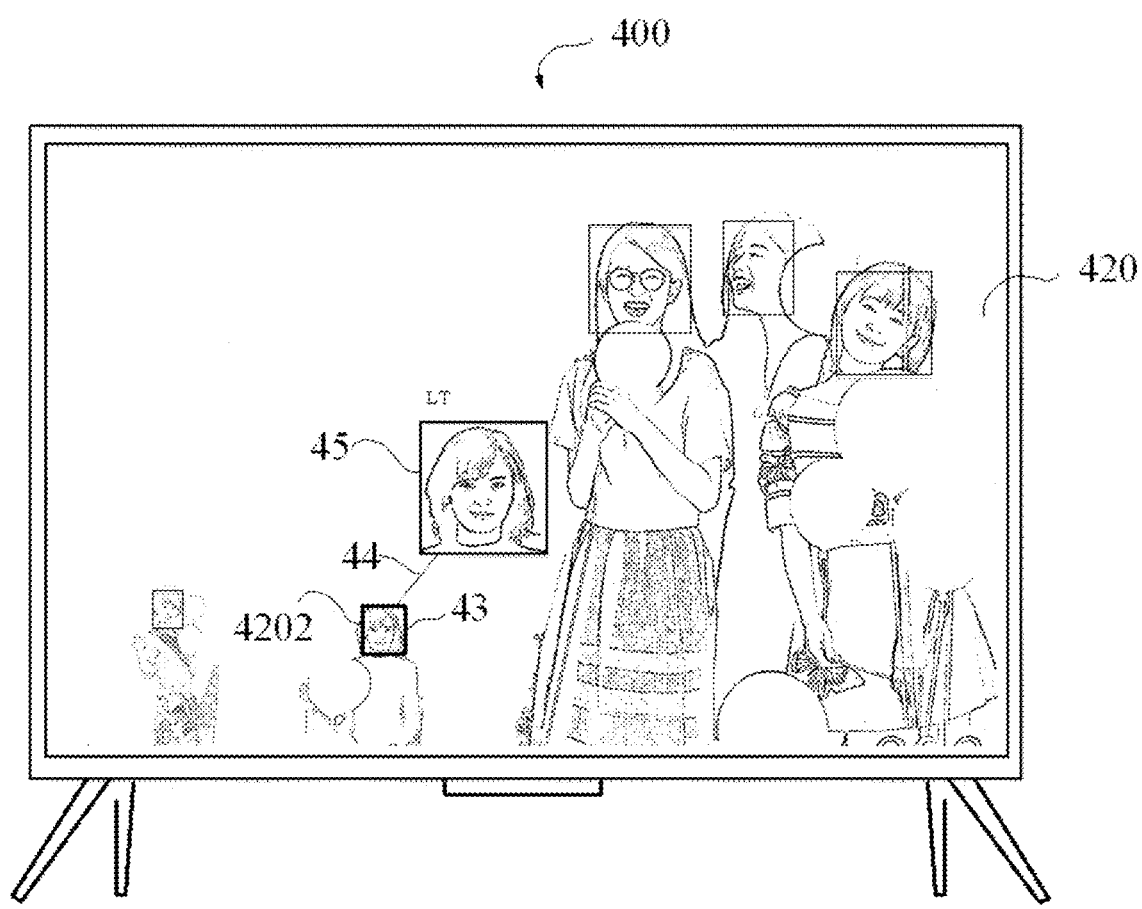
FIG. 3D illustrates a schematic diagram of a GUI 400 on the display device.

As illustrated in FIG. 3C and FIG. 3D, when the user needs to view content information of the next recognized object, he or she can operate on a directional key, e.g., the Right directional key, on the control device, according to the indication of the object recognition frames corresponding to the respective recognized objects in the screen shot image 420. The display device can respond to an instruction triggered by the Right directional key, so that the selector 43 is moved rightward to the object recognition frame 4202; the character, and the object recognition frame, both of which are magnified in proportion are displayed around the selector. The name LT of the character is annotated at the magnified object recognition frame according to the name of the character icon returned by the image recognition server. In this way, when the size of the character icon is small, the user can view the character icon more clearly at a long distance, and preliminarily know the name of the character.

Similarly, a connection line can be further displayed between the selector and the magnified object recognition frame to indicate to the user that the magnified character and corresponding object recognition frame thereof belong to the object recognition frame currently selected by the selector so that the user can view the character more clearly.

Figure 3E:
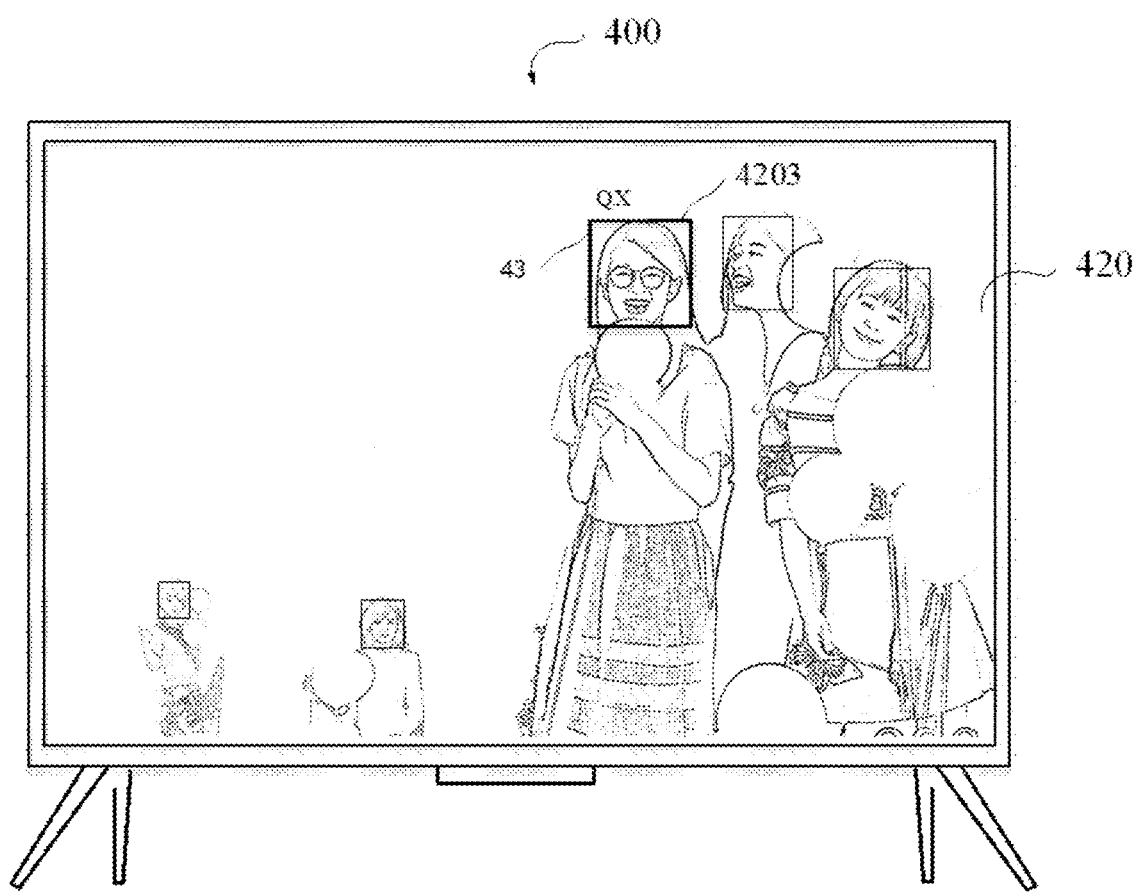
FIG. 3E illustrates a schematic diagram of a GUI 400 on the display device.

As illustrated in FIG. 3D and FIG. 3E, when the user further needs to view content information of the next recognized object, he or she can operate on a directional key, e.g., the Right directional key, on the control device, according to the indication provided by the object recognition frames corresponding to the respective recognized objects in the screen shot image. The display device can respond to an instruction triggered the Right directional key so that the selector 43 is moved rightward to the object recognition frame 4203. The name QX of the character is annotated at the position of the selector 43 according to the name of the character icon returned by the image recognition server. In this way, since the size of the character is relatively large, and the name of the character is annotated just at the character, the user can view the character clearly at a long distance, and preliminarily know the name of the character.

Figure 3F:
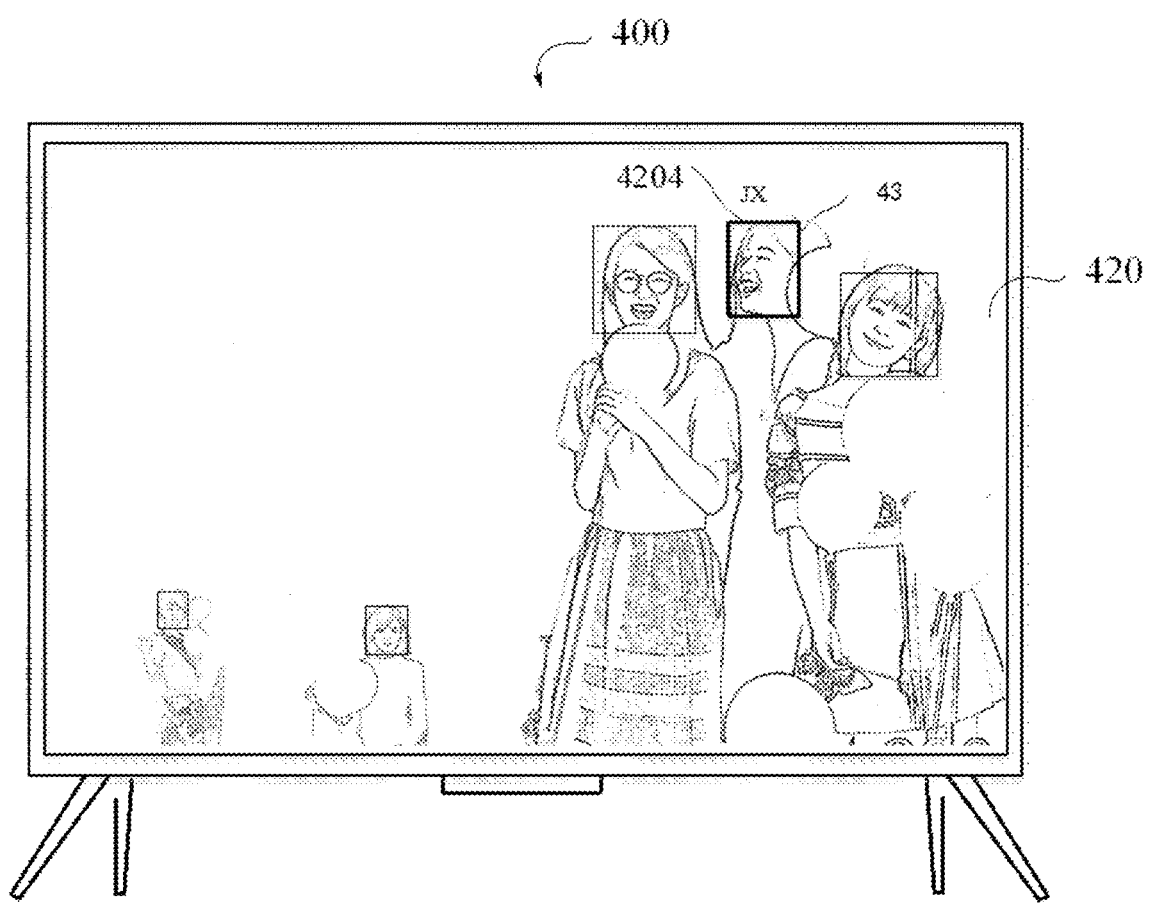
FIG. 3F illustrates a schematic diagram of a GUI 400 on the display device.

As illustrated in FIG. 3E and FIG. 3F, when the user further needs to view content information of the next recognized object, he or she can operate on a directional key, e.g., the Right directional key, on the control device, according to the indication of the object recognition frames corresponding to the respective recognized objects in the screen shot image. The display device can respond to an instruction triggered by the Right directional key so that the selector 43 is moved rightward to the object recognition frame 4204. The name JX of the character is annotated at the position of the selector 43 according to the name of the character icon returned by the image recognition server. In this way, since the size of the character icon is relatively large, and the name of the character is annotated at the character, the user can view the character icon clearly at a long distance, and preliminarily know the name of the character.

Figure 3G:
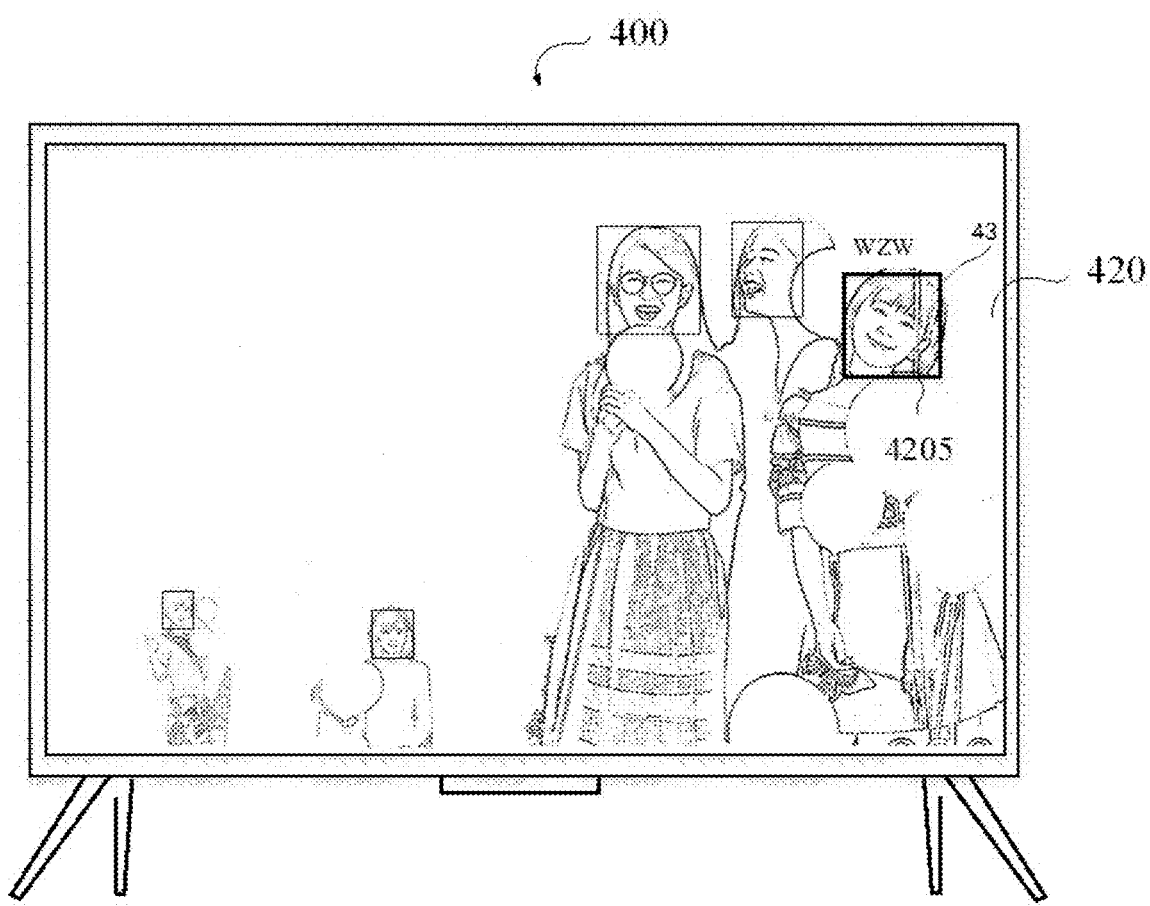
FIG. 3G illustrates a schematic diagram of a GUI 400 on the display device.

As illustrated in FIG. 3F and FIG. 3G when the user further needs to view content information of the next recognized object, he or she can operate on a directional key, e.g., the Right directional key, on the control device, according to the indication of the object recognition frames corresponding to the respective recognized objects in the screen shot image. The display device can respond to an instruction triggered by the Right directional key so that the selector 43 is moved rightward to the object recognition frame 4205. The name WZX of the character is annotated at the position of the selector 43 according to the name of the character icon 425 returned by the image recognition server. In this way, since the size of the character icon is relatively large, and the name of the character is annotated at the character, the user can view the character icon clearly at a long distance, and preliminarily know the name of the character icon.

Similarly, in FIG. 3G, when the user needs to go back to view the content information of the previous recognized object, he or she can operate on a directional key, e.g., the Left directional key, on the control device, according to the indication of the object recognition frames corresponding to the respective recognized objects in the screen shot image. The display device can respond to an instruction triggered by the Left directional key by displaying the GUI in the reverse order of FIG. 3G, FIG. 3F, FIG. 3E, FIG. 3D, and FIG. 3C.

In some embodiments, when the user operates on the control device to instruct the selector to activate the object recognition frame of the selected recognized object, for example, by pressing the confirm key on the control device, the display device responds to such an instruction to activate the object recognition frame of the selected recognized object, by displaying recommended contents associated with the selected recognized object on the display to provide the user with more detailed information about the recognized object.

Figure 3H:
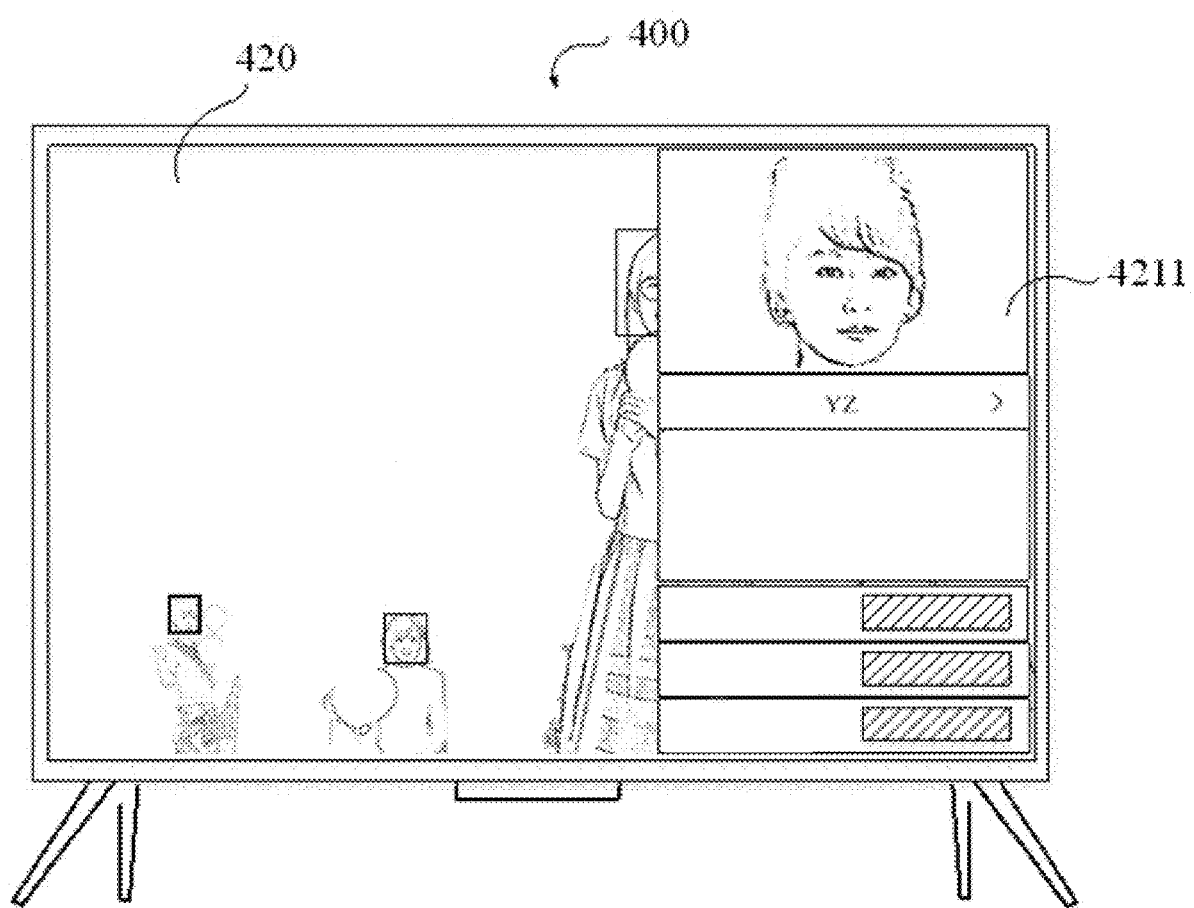
FIG. 3H illustrates a schematic diagram of a GUI 400 on the display device.

For example, as illustrated in FIG. 3C and FIG. 3H, the display device can respond to an input instruction to activate the object recognition frame 4201 by displaying recommended contents 4211 associated with the character in the graphic element 421 on the right side of the display, e.g., introduction information of YZ, information about other movies and TV series in which YZ appears, clothing and apparel information of YZ in the current segment of a TV series, etc.

Figure 3I:
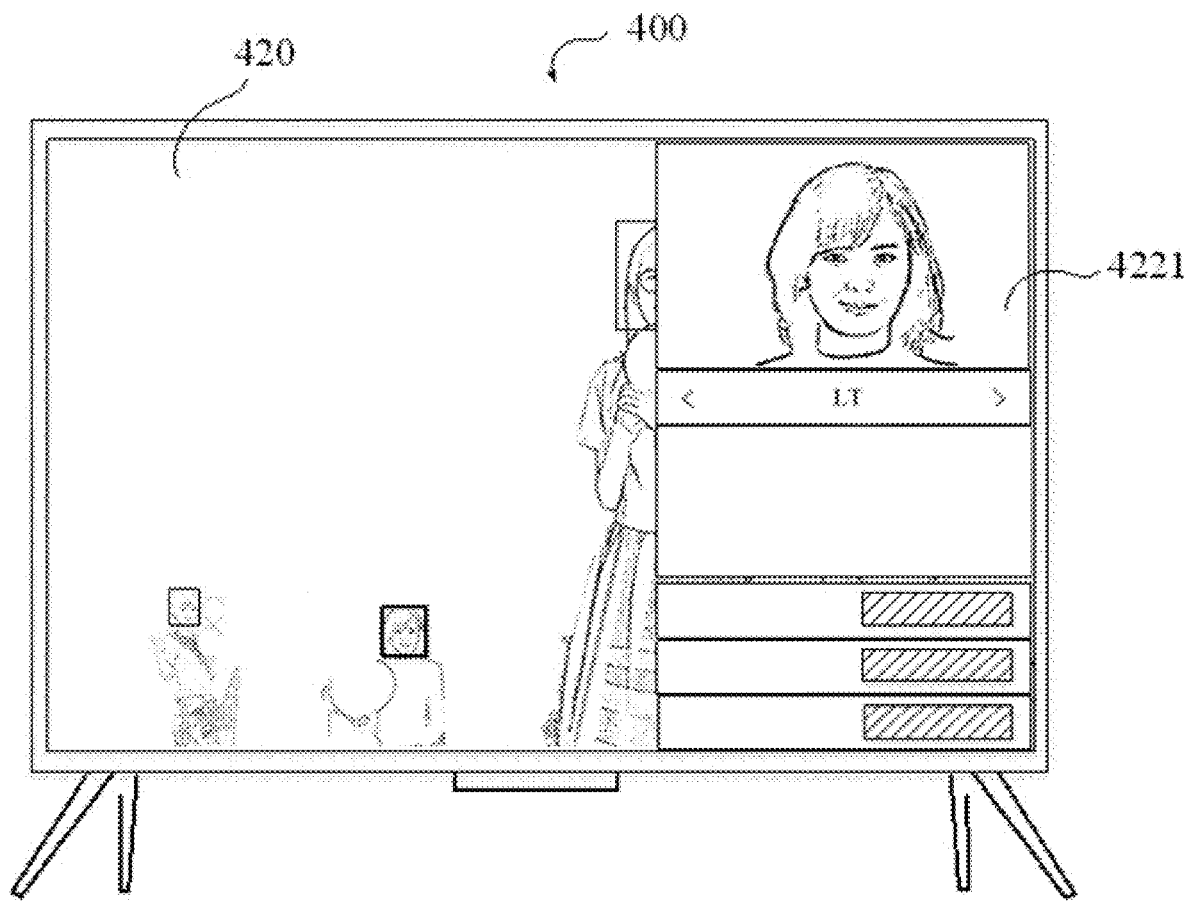
FIG. 3I illustrates a schematic diagram of a GUI 400 on the display device.

As illustrated in FIG. 3D and FIG. 3I, the display device can activate the object recognition frame 4202 in response to an input instruction by displaying recommended contents 4221 associated with the character as shown in the graphic element 422 on the right of the display, e.g., introduction information of LT, information about other movies and TV series in which LT appears, clothing and apparel information of LT in the current segment of a TV series, etc.

Figure 3J:
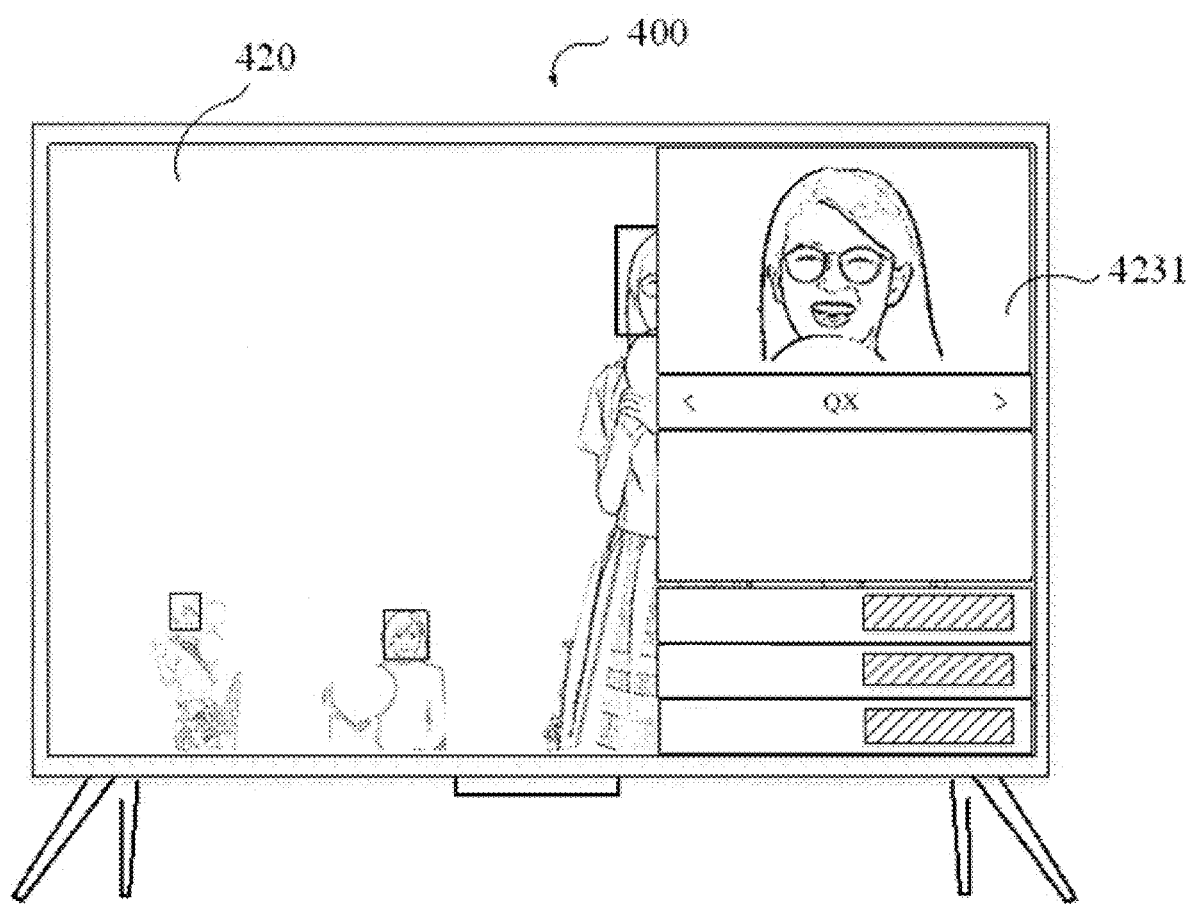
FIG. 3J illustrates a schematic diagram of a GUI 400 on the display device.
Figure 3K:
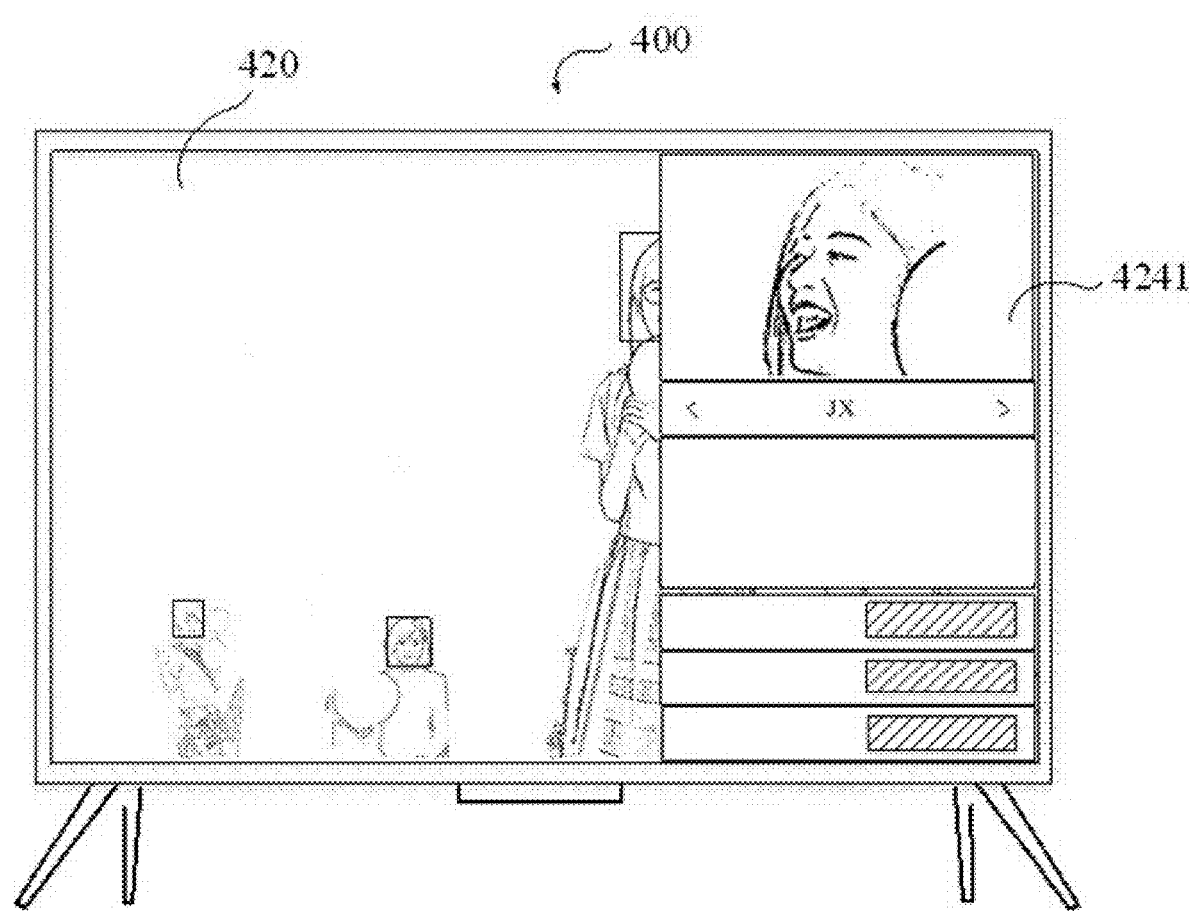
FIG. 3K illustrates a schematic diagram of a GUI 400 on the display device.
Figure 3L:
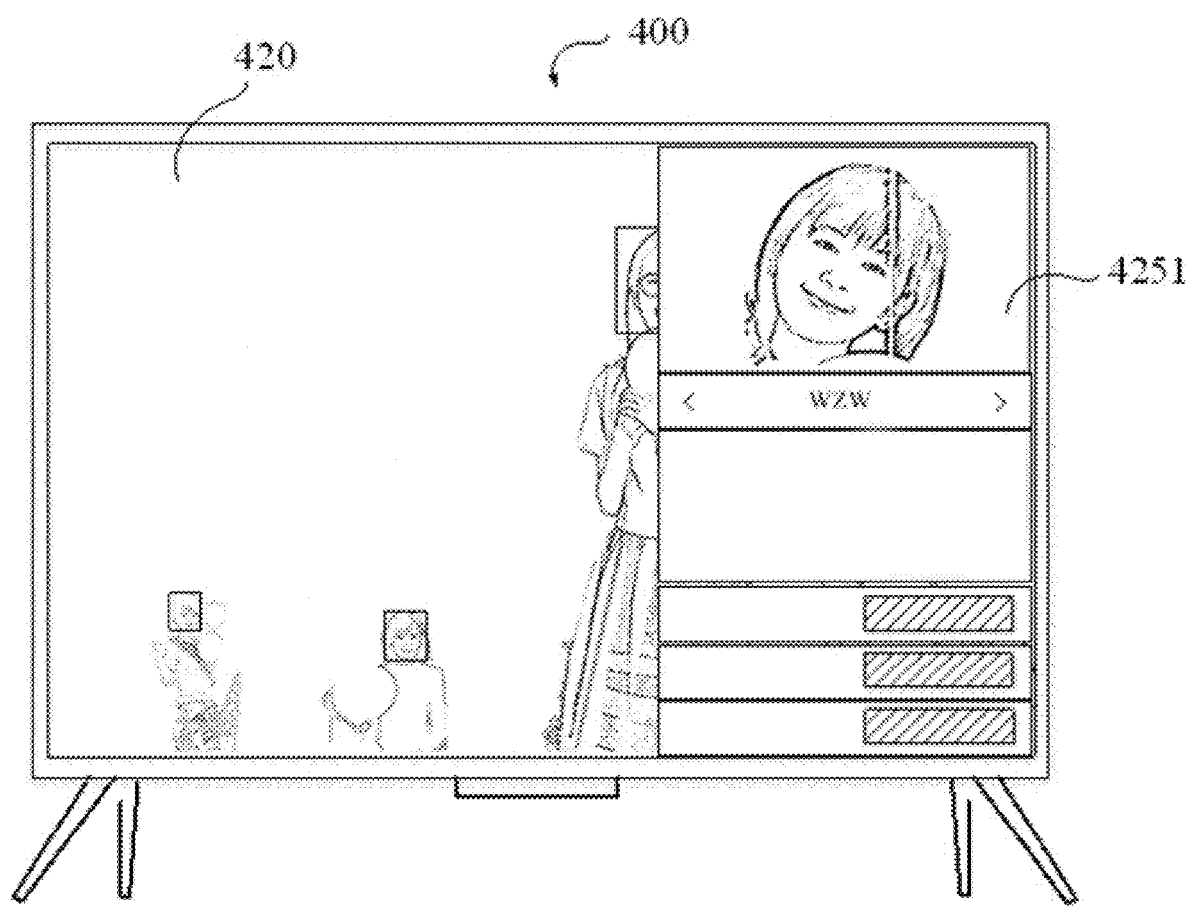
FIG. 3L illustrates a schematic diagram of a GUI 400 on the display device.

Similarly, in FIG. 3E to FIG. 3G, the display device can respond respectively to input instructions to activate the object recognition frame 4203 to 4205 by displaying recommended contents 4231 to 4251 associated with the character shown in the graphic elements 423 to 425 respectively on the right of the display as illustrated in FIG. 3J to FIG. 3L.

In some embodiments, in FIG. 3A, when the user operates on the control device, for example, by pressing the confirm key on the control device, to instruct the selector 43 to select the graphic elements 421 to 424, the display device can also respond respectively to input instructions to activate the graphic elements 421 to 424, by displaying recommended contents 4211 to 4241 associated with the character in the graphic elements 421 to 424 respectively on the display as illustrated in FIG. 3H to FIG. 3K, to provide the user with more detailed character information.

Moreover in any one of the GUIs as illustrated in FIG. 3A to FIG. 3L above, the user can operate on the control device, and for example, press or keep on pressing a Back key on the control device, and the display device can respond to an input instruction triggered by the Back button so that the display device stops displaying the screen shot image, and stop presenting the recognized objects in the screen shot image, and thus continues with displaying the segment of the TV series as illustrated in FIG. 2 on the display for further watching by the user.

As described in the embodiments above, while a segment of a TV series is being played on the display device, the display device can provide the user with a screen shot image of a display image of the segment of the TV series, and content information of recognized objects recognized in the screen shot image, for example, in response to an input of the user so that the user can know information about actors in the segment of the TV series while watching the segment of the TV series without referring to a device other than the display device (e.g., a smart mobile phone) for associated information of the segment of the TV series, thus improving users' experience.

Furthermore while the user is being provided with the content information of the recognized objects in the screen shot image, the object recognition frames corresponding to the recognized objects are annotated to provide the user with visual browsing marking or demarcation of the recognized objects in the screen shot image, and real-time operational and interactive feedback.

Still furthermore while the recognized objects in the screen shot image is being browsed, the user typically watches the display device at a long distance, so when the sizes of the recognized objects are small, the images of the recognized objects, and the names of the recognized objects are magnified and displayed so that the user can browse the images and the names of the recognized objects more clearly at a long distance as demanded by the user.

Figure 4A:
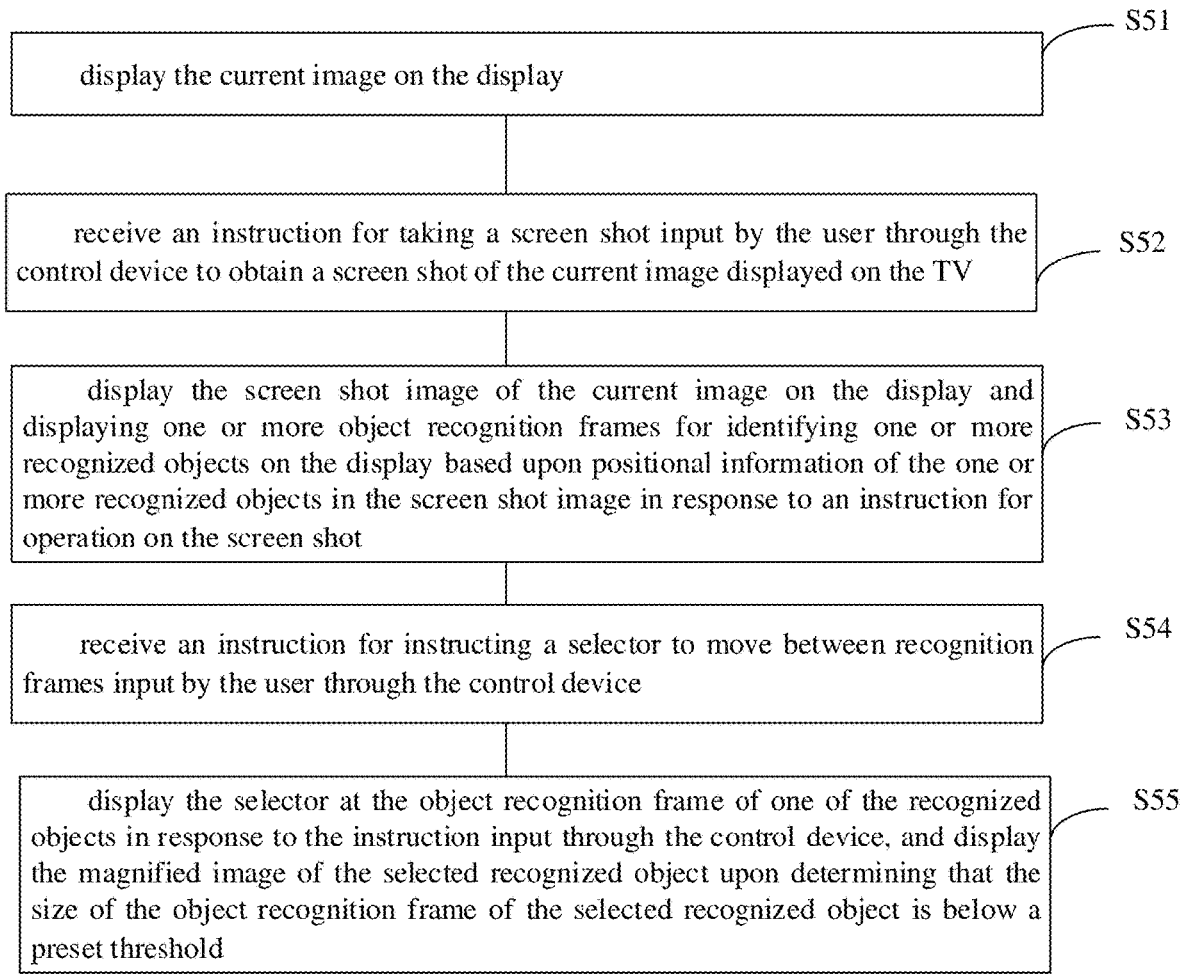
FIG. 4A illustrates a flow chart of a method for displaying a graphic user interface associated with a screen shot.
Figure 4B:
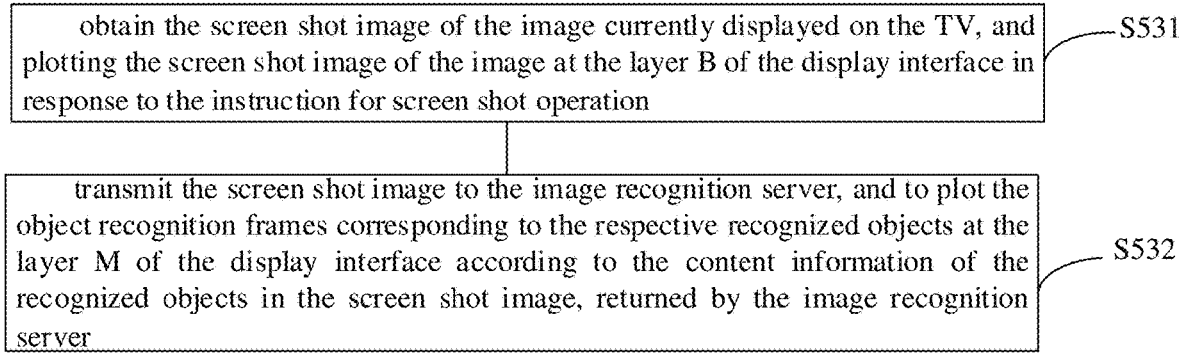
FIG. 4B illustrates a flow chart of a method for displaying a graphic user interface associated with a screen shot.
Figure 4C:
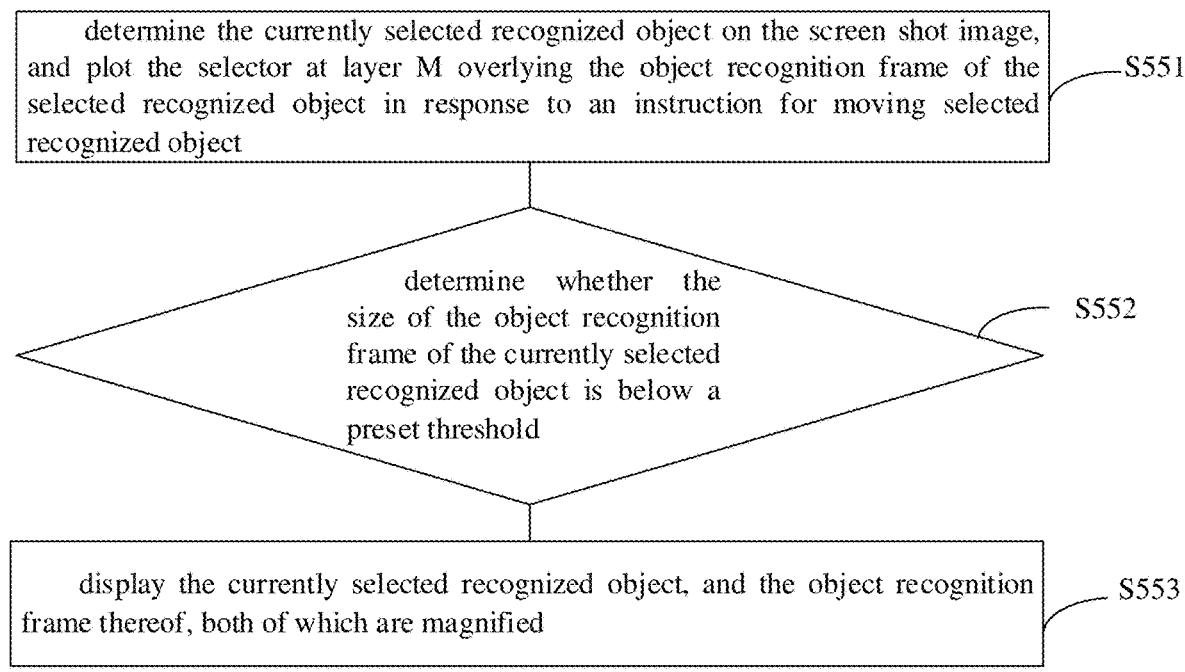
FIG. 4C illustrates a flow chart of a method for displaying a graphic user interface associated with a screen shot.

FIG. 4A to FIG. 4C illustrate a flow chart of a method for displaying a graphic user interface of a screen shot according to some embodiments of the application.

With reference to the method as illustrated in FIG. 4A, the method can include the following operations S51 to S54.

The operation S51 is to display the current image on the display. For example, the segment of the TV series as illustrated in FIG. 2 can be displayed on the display.

The operation S52 is to receive an instruction for taking a screen shot input by the user through the control device to obtain a screen shot of the current image displayed on the TV. For example, the user presses a preset key (e.g., a key for screen shot) on the control device.

The operation S53 is to display the screen shot image of the current image on the display and displaying one or more object recognition frames for identifying one or more recognized objects on the display based upon positional information of the one or more recognized objects in the screen shot image in response to an instruction for operation on the screen shot. For example, in the GUI 400 as illustrated in FIG. 3B, the graphic element 420 in the screen shot image of the current image is displayed in full screen, and the object recognition frames 4201 to 4205 are displayed respectively at the graphic elements 421 to 425 of the five character icons recognized in the screen shot image 420.

The operation S54 is to receive an instruction for instructing a selector to move between recognition frames input by the user through the control device. For example, the user presses a directional key (e.g., the Right directional key) on the control device.

The operation S55 is to display the selector at the object recognition frame of one of the recognized objects in response to the instruction input through the control device, and display the magnified image of the selected recognized object upon determining that the size of the object recognition frame of the selected recognized object is below a preset threshold. For example, in the GUI 400 as illustrated in FIG. 3C, the selector 43 is displayed at the object recognition frame 4201; and the character 421, and the object recognition frame 4201, both of which are magnified in proportion are displayed around the selector 43 upon determining that the size of the object recognition frame 4201 is below the preset threshold.

Figure 5A:
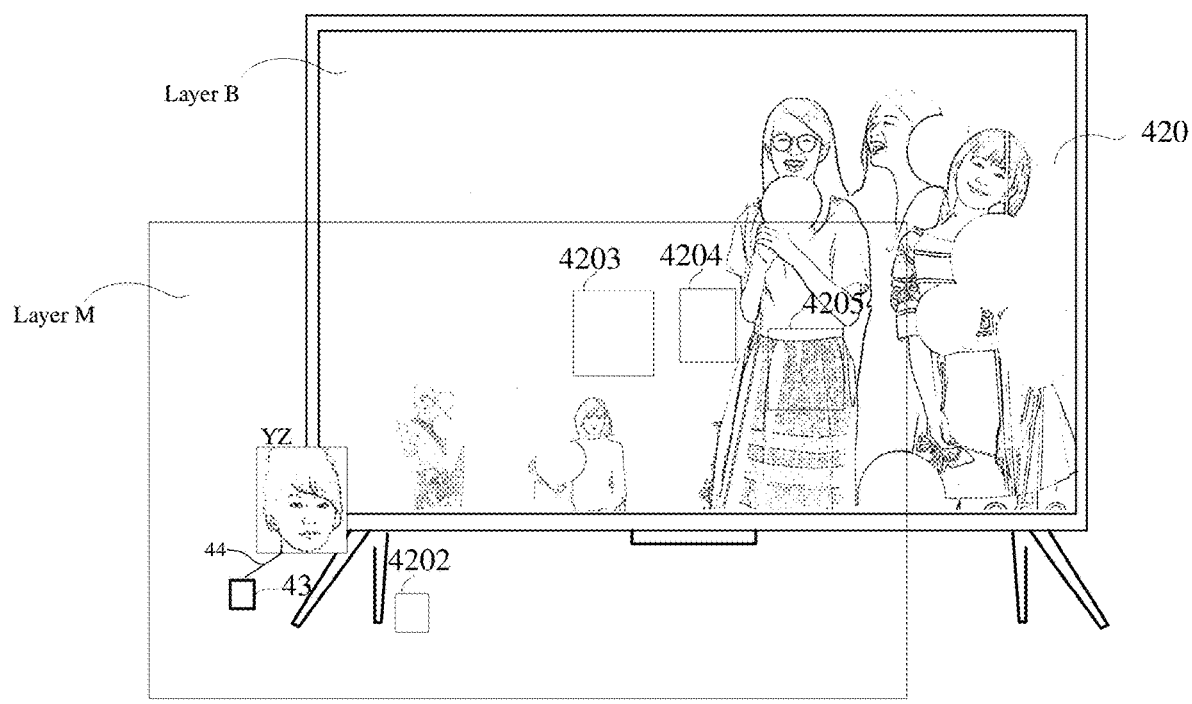
FIG. 5A illustrates a schematic structural diagram of distributed layers of a recognized object presentation interface.
Figure 5B:
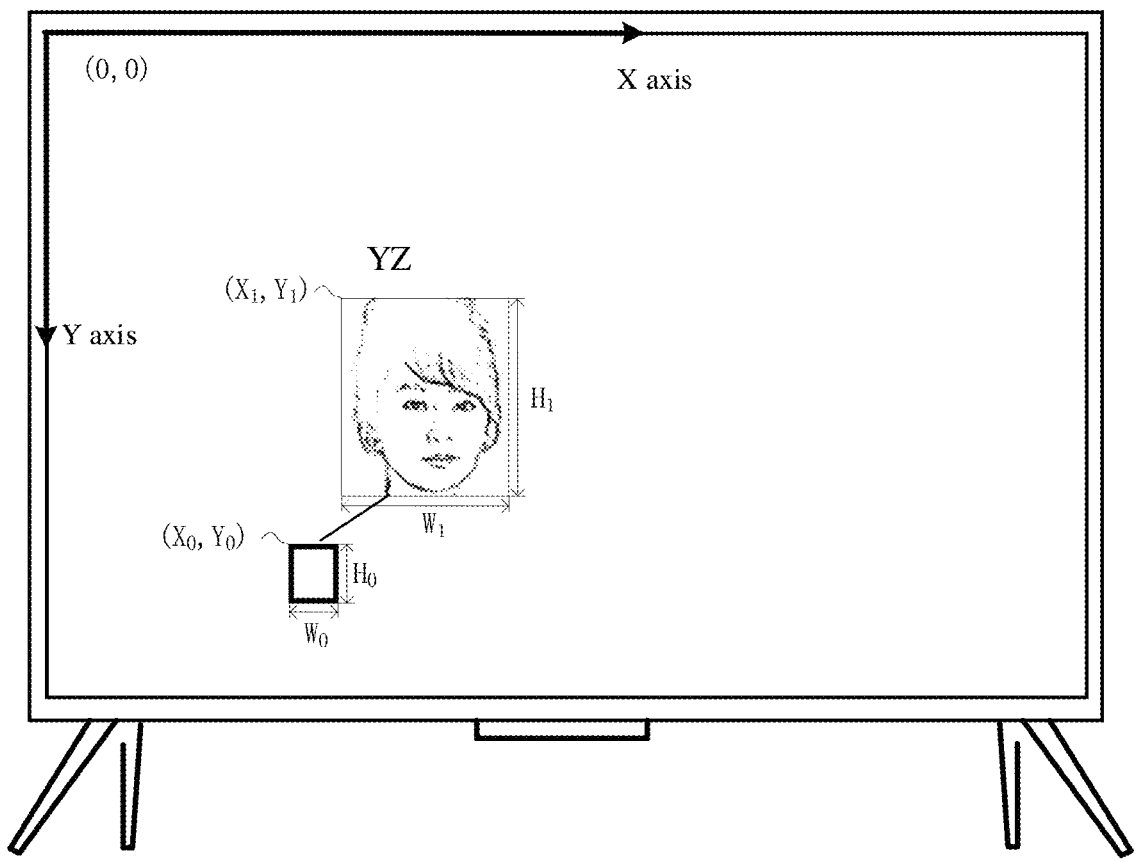
FIG. 5B illustrates a schematic diagram of positional information of a recognized object.

Particularly with reference to the method as illustrated in FIG. 4B, the schematic diagram of the distributed layers of the recognized object presentation interface as illustrated in FIG. 5A, and the schematic diagram of the positional information of the recognized object as illustrated in FIG. 5B, the operation S53 further includes the following operations S531 and S532.

The operation S531 is to obtain the screen shot image of the image currently displayed on the TV, and plotting the screen shot image of the image at the layer B of the display interface in response to the instruction for screen shot operation.

The operation S532 is to transmit the screen shot image to the image recognition server, and to plot the object recognition frames corresponding to the respective recognized objects at the layer M of the display interface according to the content information of the recognized objects in the screen shot image, returned by the image recognition server.

It shall be noted that FIG. 5A illustrates two layers B and M constituting the recognized object presentation interface in the screen shot image 420, where layer B is the bottom-most view where the screen shot image of the current image is plotted, and layer M is a view arranged upon layer B where the object recognition frames 4202 to 4205, the selector 43, the names of the recognized objects, the magnified image of the recognized object, and the connection line 44 connecting the magnified image of the recognized object with the selector 43 are plotted.

When the image recognition server returns the content information of the recognized objects, the layer M is set in a visible state, where the content information of the recognized objects includes but not limited to the types of the recognized objects (e.g., characters, animals, clothing, logos, etc.), positional information of the recognized objects in the screen shot image, the names of the recognized objects (e.g., character names or animal names), related recommended information of the recognized objects (e.g., movies including the characters), etc.

The positional information of the recognized objects indicates the display positions and sizes, of the object recognition frames corresponding to the recognized objects, in the screen shot image. Here the object recognition frames corresponding to the recognized objects are rectangular frames, for example. Here the positional information of the recognized objects includes but will not be limited to coordinate information of any one of corners of the rectangular frames corresponding to the contours of the recognized objects, and the widths and the heights of the rectangular frames.

As illustrated in FIG. 5B, for example, the positional information of the recognized object include: X-axis coordinate X0 and Y-axis coordinate Y-0 of the top-left corner of the rectangular frame corresponding to a contour of the recognized object, the width (the length on the X axis) W0, of the rectangular frame corresponding to the contour of the recognized object, in the screen shot image, and the height (the lengths on the Y axis) H0, of the rectangular frame corresponding to the contour of the recognized object, in the screen shot image.

Specifically, the obtained positional information of the respective recognized objects is traversed, and an ImageView control is created for each recognized object, where the position and the size of the ImageView control is determined according to the positional information of the recognized object as illustrated in FIG. 5B. Then the ImageView controls are rendered by the pictures in the object recognition frames stored in the display device, and the ImageView controls are plotted at layer M, so that the object recognition frames corresponding to the respective recognized objects are plotted at layer M of the display according to the positional information of the recognized objects returned by the image recognition server.

With reference to the method as illustrated in FIG. 4C, the schematic diagram of the distributed layers of the recognized object presentation interface as illustrated in FIG. 5A, and the schematic diagram of the positional information of the recognized object as illustrated in FIG. 5B, the operation S55 further includes the following operations S551 to S553.

The operation S551 is to determine the currently selected recognized object on the screen shot image, and plot the selector at layer M overlaying the object recognition frame of the selected recognized object in response to an instruction for moving selected recognized object.

Here the position and the size of the created ImageView control are still controlled according to the positional information of the selected recognized object as illustrated in FIG. 5B. Firstly the currently selected recognized object on the screen shot image is determined according to the order in which the user operates on the directional keys on the control device, and then the ImageView control is rendered based on the picture of the selector stored in the display device, and the ImageView control is plotted at layer M to overlay the object recognition frame of the currently selected recognized object.

Since the positions and the sizes of both the object recognition frame of the selected recognized object, and the ImageView control corresponding to the selector are created based upon the positional information of the selected recognized object, their sizes and shapes match.

Furthermore, the object recognition frames corresponding to the respective recognized objects at layer M provide indications for selection, the object recognition frame of the next recognized object to be selected by the selector is determined according to an order triggered by the user's operation on the directional keys of the control device.

The object recognition frame of the next recognized object to be selected by the selector is determined as follows.

Firstly the coordinates (X, Y) of the top-left corners of the rectangular frames corresponding to the contours of the other recognized objects are traversed, and the difference in horizontal coordinate or vertical coordinate from the coordinates (X0, Y0) of the top-left corner of the rectangular frame corresponding to the contour of the currently selected recognized object are calculated as |X–X0| or |Y–Y0|.

Then the rectangular frame corresponding to the contour of the other recognized object with the least difference is selected as the object recognition frame of the next selected recognized object, i.e., the position to be selected by the selector.

If there are multiple rectangular frames corresponding to the contours of recognition icons with the same difference in horizontal coordinate or vertical coordinate, the distances between the top-left corners of the rectangular frames corresponding to the contours of the respective recognized objects, and the top-left corner of the rectangular frame corresponding to the contour of the currently selected recognized object (i.e., the direct distance between the top-left corners of the two rectangular frames) is calculated according to the Pythagorean Theorem, and the rectangular frame corresponding to the contour of the recognized object with the shortest distance is selected as the object recognition frame of the next selected recognized object. In other embodiments, the next selected recognized object is determined in alternative manners.

The operation S552 is to determine whether the size of the object recognition frame of the currently selected recognized object is below a preset threshold, and if so, to proceed to the operation S553; otherwise, to terminate the flow.

Further referring to the schematic diagram of the positional information of the recognized object as illustrated in FIG. 5B, when the area W0*H0 of the object recognition frame of the selected recognized object is below or at a preset threshold, or when the width W0 and/or the height H0 of the object recognition frame of the selected recognized object is or are below or at a preset threshold(s), it is determined that the size of the object recognition frame of the selected recognized object is below the preset threshold; otherwise, it is determined that the size of the object recognition frame of the selected recognized object is not below the preset threshold, and the flow is terminated.

The operation S553 is to display the currently selected recognized object, and the object recognition frame thereof, both of which are magnified.

Particularly the recognized object image in the object recognition frame of the currently selected recognized object is taken out of the screen shot image, or a screen shot image thereof is obtained again, and the recognized object image, and the image of the object recognition frame thereof are magnified in proportion. An ImageView control is created for the currently selected recognized object, where the controller is sized as illustrated in FIG. 5B, where the width and the height thereof are W1 and H1, and the control is positioned as illustrated in FIG. 5B, where the coordinates of the top-left corner of the control are (X1, Y1); and thereafter the recognized object image, and the image of the object recognition frame thereof, both of which are magnified are filled into the ImageView control, and the ImageView control is plotted at the layer M.

Moreover since the magnified recognized object image may be blurred, the magnified recognized object image can be optimized in an interpolation algorithm. The interpolation algorithm is executed as known to those of ordinary skill in the art. For example, the edge area and the smooth area of the original image are extracted, and sample pixels are added thereto respectively, so that the user is able to view the recognized object more clearly.

In some embodiments, the name of the selected recognized object is further displayed at the position of the selected recognized object image, and the object recognition frame thereof, both of which are magnified.

For example, in the GUI 400 as illustrated in FIG. 3C, the name YZ of the character is displayed at the top-left corner of the character in the graphic element 421, and the object recognition frame 4201, both of which are magnified. Here as illustrated in FIG. 5B, a TextView control is created for the selected recognized object, the name YZ of the selected recognized object is filled into the TextView control, and the TextView control filled with the name is plotted at the layer M.

In some embodiments, a connection is further displayed to visually connect the selector with the image of the selected recognized object, and the object recognition frame thereof, both of which are magnified, where the connection is displayed together with the image of the selected recognized object, and the object recognition frame thereof, both of which are magnified.

For example, in the GUI 400 as illustrated in FIG. 3C, the selector 43 is visually connected with the magnified human icon and the object recognition frame 4201 through the connection line 44. Here as illustrated in FIG. 5B, an ImageView control is created for the selected recognized object, the connection line stored in the display device is filled into the ImageView control, and the ImageView control filled with the connection line is plotted at the layer M.

In some embodiments, the display device further receives an instruction input by the user to instruct the object recognition frame of the selected recognized object to be activated, and displays recognition contents associated with the selected recognized object on the display in response to the instruction input by the user.

For example, in the GUI 400 as illustrated in FIG. 3H, the recommended contents 4211 associated with the character, e.g., introduction information of YZ, information about other movies and TV series including YZ, identical clothing information of YZ in the current segment of a TV series, etc., are displayed on the left of the display. Here those associated the recommended contents 4211 are displayed at a layer T above the layer M.

As described in the embodiments above, while the screen shot image of the currently played image is being displayed on the display, firstly the respective recognized objects in the screen shot image are annotated (marked, identified, or demarcated) using the recognized object frames, and then the selected recognized object is highlighted using the selector according to the annotations of the recognized objects corresponding to the respective recognized objects. Also in a case that the size of the selected recognized object is small, the selected recognized object are magnified and displayed, to further provide the user with a clear browsing experience.

The functionality is performed by plotting the screen shot image, the recognized object frames corresponding to the recognized objects, the selector on the selected recognized object, etc., at the same layer. However the screen shot image occupies a significant part of a memory in the display device due to high definition requirement. If the selector is plotted directly at the layer where the screen shot image is placed, since the screen shot image occupies a significant part of the memory, and the selector is further plotted on the selected recognized object each time the recognized object is moved using the selector, there will be a considerable calculation, computation, or processing workload of the display device to refresh the layer using a Graphic Processing Unit (GPU), thus consuming a significant part of the memory, and degrading the performance.

Accordingly in these embodiments, the functionality above is performed by plotting the screen shot image at one layer, and the object recognition frames, the selector, etc., at another layer. As such, unlike the approach where the selector is plotted directly at the image where the screen shot image is placed, the screen shot image and the selector are plotted in the approaches above in two layers, so that each time the selector is moved, only the layer where the selector is placed is refreshed without refreshing the layer where the screen shot image is placed, thus reducing the calculation workload and memory consumption, and improving the performance. At the same time, the user is provided with the visualized recognized objects in the screen shot image, and real-time operational and interactive feedback.

Moreover the embodiments according to the application provide a display device, and the display device includes the following components.

A display is configured to display a GUI and a selector, where the position of the selector on the display is moved in response to a user input instruction. For example, the GUI 400 as illustrated in FIG. 3A is displayed on the display, where the GUI 400 includes the currently played image 41, the floating presentation area 42 displayed above the currently played image 41, and located below the currently played image 41, and the selector 43 in the floating presentation area 42 to indicate that the screen shot image 420 is selected.

A user interface is configured to receive the input instruction to control the selector. For example, the user interface receives the instruction, input by the user pressing the Left or Right directional keys on the control device (e.g., the remote controller), to control the selector to move leftward or rightward in the GUI to change the position of the selector in the GUI.

A controller is configured to respond to the input instruction to obtain a screen shot of the current image displayed on the screen, display the screen shot image of the current image on the display, and display an object recognition frame for identifying at least one recognized object in the screen shot image on the display based upon positional information of at least one recognized object. For example, in the GUI 400 as illustrated in FIG. 3B, the screen shot image 420 of the current image is displayed in full screen, and the object recognition frames 4201 to 4205 are displayed respectively at the five characters in the graphic elements 421 to 425 recognized in the screen shot image 420.

In some embodiments, the controller is further configured to respond to the input instruction to instruct the selector to move between recognition frames, display the selector at the object recognition frame of one of the recognized objects, and display the magnified image of the selected recognized object upon determining that the size of the object recognition frame of the selected recognized object is below a preset threshold. For example, in the GUI 400 as illustrated in FIG. 3C, the selector 43 is displayed at the object recognition frame 4201; and the character magnified in proportion is displayed around the selector 43 upon determining that the size of the object recognition frame 4201 is below the preset threshold.

In some embodiments, the controller is further configured to display the magnified recognition frame of the selected recognized object. For example, in the GUI 400 as illustrated in FIG. 3C, the selector 43 is displayed at the object recognition frame 4201; and the character, and the object recognition frame 4201, both of which are magnified in proportion being displayed around the selector 43.

In some embodiments, the controller is further configured to display the name of the selected recognized object at the position of the selected recognized object image, and the object recognition frame thereof, both of which are magnified. For example, in the GUI 400 as illustrated in FIG. 3C, the name YZ of the character is displayed at the top-left corner of the character icon, and the object recognition frame 4201, both of which are magnified.

In some embodiments, the controller is further configured to display a connection visually connecting the selector with the image of the selected recognized object, and the object recognition frame thereof, both of which are magnified, where the connection is displayed together with the image of the selected recognized object, and the object recognition frame thereof, both of which are magnified. For example, in the GUI 400 as illustrated in FIG. 3C, the selector 43 is visually connected with the magnified human and object recognition frame 4201 through the connection line 44.

In some embodiments, the controller is further configured to respond to an input instruction to activate the selected recognized object, display recognition contents associated with the selected recognized object on the display. For example, in the GUI 400 as illustrated in FIG. 3H, the recommended contents 4211 associated with the character, e.g., introduction information of YZ, information about other movies and TV series in which YZ appears, clothing or apparel information of YZ in the current segment of a TV series, etc., are displayed on the left of the display.

Figure 6:
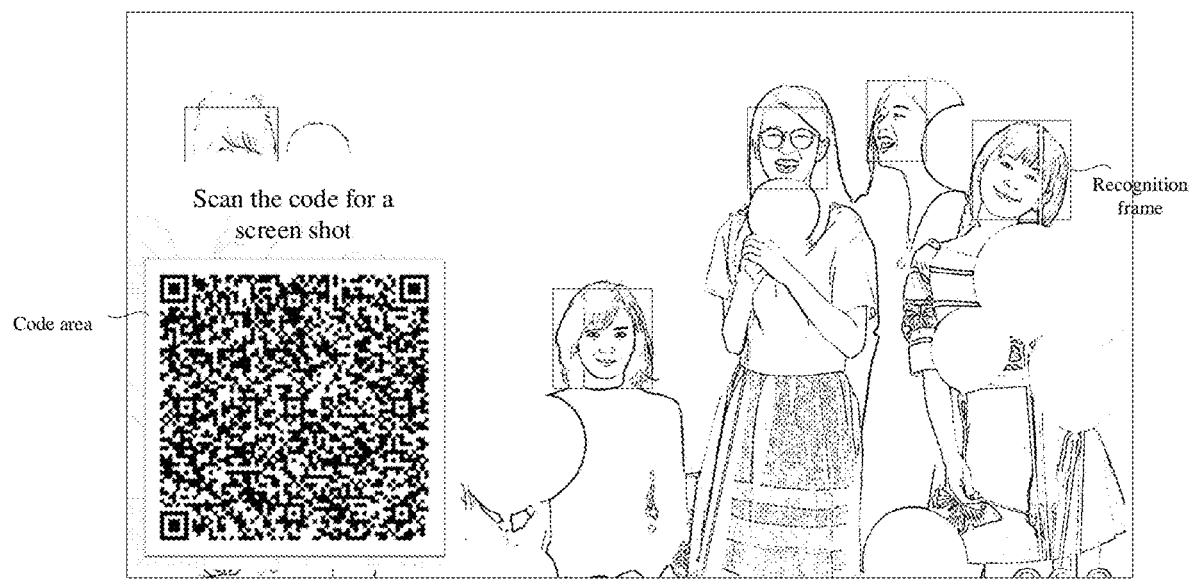
FIG. 6 is a schematic diagram of a layout of an object recognition interface according to some embodiments of the application.
Figure 7:
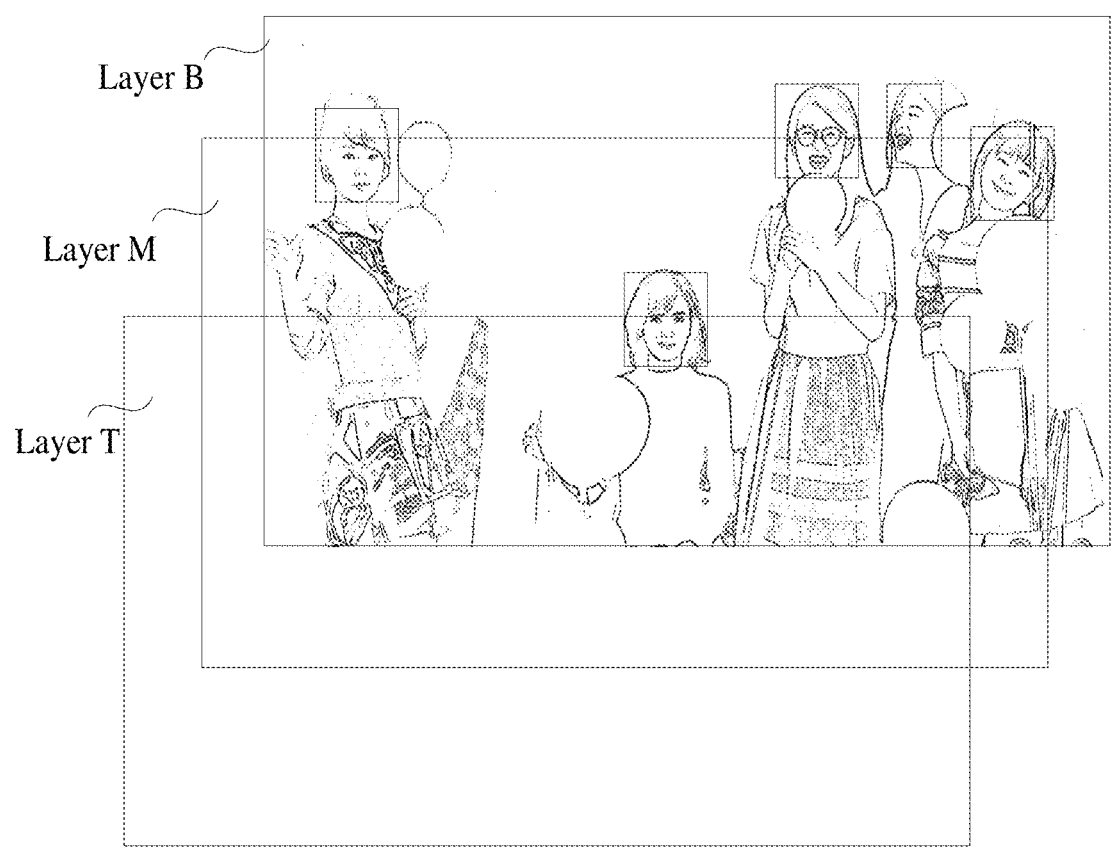
FIG. 7 is a schematic structural diagram of distributed layers of the object recognition interface according to some embodiments of the application.

FIG. 6 illustrates a schematic diagram of a layout of the object recognition interface, which is displayed in the user interface of the display device. FIG. 7 illustrates a schematic diagram of layers distributed among the object recognition interface, and the object recognition interface includes three parts in total. The layer B is the bottommost view where the screen shot (a hybrid screen shot of OSD and VEDIO) of the display device is plotted, the layer M is a view in the middle layer where the object recognition frames and the focus frame are placed, and the layer T is the topmost view where a two-dimension barcode for sharing the screen shot is placed.

All of the layer B, the layer M, and the layer T are ViewGroup controls of the display interface, and these three layers are stacked over each other in the order of the topmost layer T overlaying the other two layers, so a key event is controlled to be listened to or monitored and handled by just one of the layers at a time. For example, in the situation in FIG. 7, the key event is monitored and handled by only the layer T, while the key event is not monitored by the layer B and the layer T.

As described below, a first layer is referred to layer B, a second layer is referred to layer M, and a third layer is referred to layer T.

Figure 8:
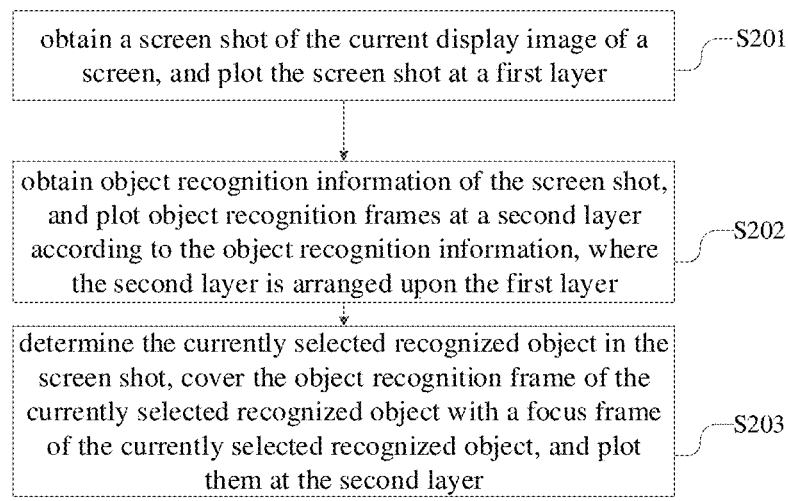
FIG. 8 is a flow chart of a method for displaying recognized objects in a screen shot according to some embodiments of the application.

As illustrated in FIG. 8, a method for displaying recognized object in a screen shot according to some embodiments of the application includes the following operations S201 to S203.

The operation S201 is to obtain a screen shot of the current display image of a screen, and to plot the screen shot at a first layer.

For example, the screen is a screen of a smart TV set, a user can obtain a screen shot of the currently played video through a remote controller, and the screen shot is plotted at the first layer at the backend upon reception of instruction for the screen shot.

The operation S202 is to obtain object recognition information of the screen shot, and to plot object recognition frames at a second layer according to the object recognition information, where the second layer is arranged on top of the first layer.

For example, the object recognition information of the screen shot includes but is not limited to the types of objects in the screen shot (e.g., characters, animals, clothing, logos, etc.), positional information of the objects in the screen shot (simply positional information of the objects), the names of the objects, related recommended information of the objects, etc.

The operation S203 is to determine the currently selected recognized object in the screen shot, to cover the object recognition frame of the currently selected recognized object with a focus frame for the currently selected recognized object, and to plot them at the second layer.

The object recognition information includes positional information of the objects.

In some embodiments, plotting the object recognition frames at the second layer according to the object recognition information particularly further includes: filling or including the object recognition frames into ImageView controls, and plotting the ImageView controls filled with the object recognition frames at the second layer, where the ImageView controls are created according to the positional information of the objects; and marking, identifying, or demarcating the object recognition frame of the currently selected recognized object with the focus frame for the currently selected recognized object, and plotting them at the second layer, which further includes: filling the focus frame for the currently selected recognized object into an ImageView control, and plotting the ImageView control filled with the focus frame at the second layer to mark, identify, or demarcate the object recognition frame of the currently selected recognized object therewith, where the ImageView control is created according to the positional information of the currently selected recognized object.

In some embodiments, a focus frame previously plotted at the second layer is deleted while plotting the focus frame of the currently selected recognized object at the second layer.

In some embodiments, the method further includes: plotting a two-dimension barcode for sharing the screen shot at a third layer overlaying the second layer.

In some embodiments, the method further includes: controlling the third layer to be displayed or hidden, in response to an instruction input by a user through a remote controller.

In some embodiments, the method further includes: traversing central coordinates of the other recognized objects, and calculating the differences in horizontal coordinate and vertical coordinate between the central coordinates of the other objects and those of the currently selected recognized object; selecting one of the other recognized objects with the least difference as the next one for focus frame plotting; and if there are multiple recognized objects with the same difference, calculating the distances between the recognized objects with the same difference and the central coordinates of the currently selected recognized object according to the Pythagorean Theorem, and selecting a recognized object with the shortest distance as the next one for focus frame plotting.

In some embodiments, the display device process the screen shot by the following operations.

In a first operation, after a display interface is presented, the display device plots the first layer directly, and sets the obtained the screen shot as a background of the first layer.

In a second operation, the display device requests a backend server for obtaining output data of recognition contents in the screen shot, upon starting a screen shot function. When there are returned output data from the backend server, the display device sets the second layer e visibly overlaying the first layer, and also plots the object recognition frames of the recognized objects, i.e., contour frames of the recognized objects, according to the obtained positional information of the recognized objects.

The display device traverses the obtained positional information of the respective recognized objects, creates an ImageView control for each recognized object, where the position and the size of the ImageView control are controlled according to the positional information of each recognized objects, fills an object recognition frame image into the ImageView control, plots the ImageView control filled with the object recognition frame into a ViewGroup control represented by the second layer, and sets the second layer visibly overlaying the first layer, where for example, no background may be set at the second layer so that the second layer is transparent and the first layer is visible under the second layer.

Figure 9:
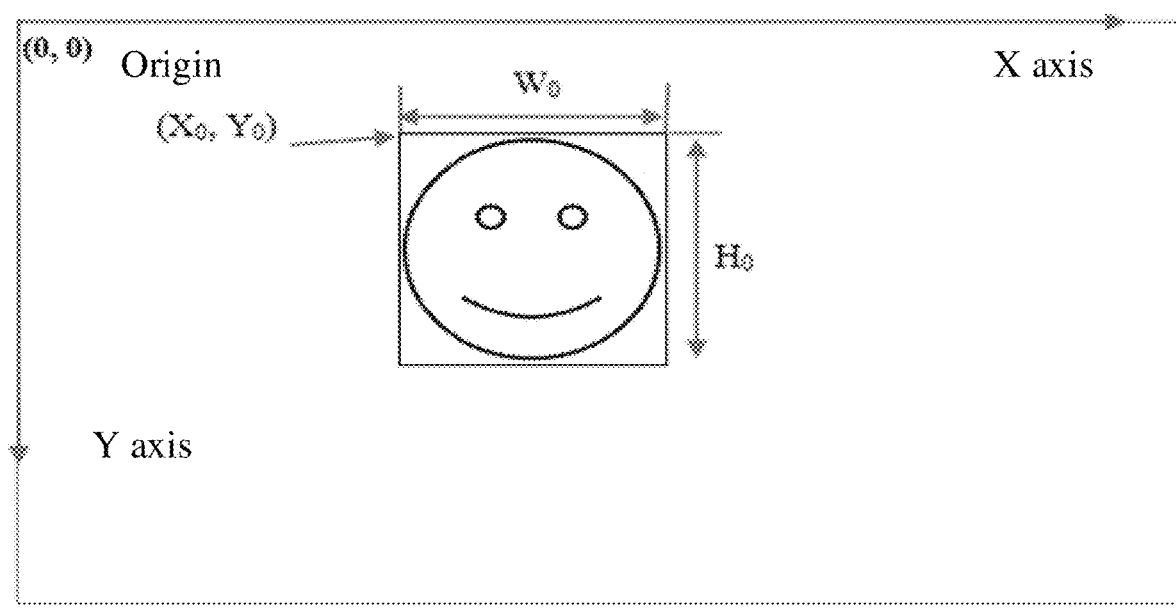
FIG. 9 is a schematic diagram showing positional information of an object recognition frame according to some embodiments of the application.

Here FIG. 9 illustrates positional information of a recognized object according to some embodiments of the application, where the positional information includes but is not limited to four components: for example, an x-axis coordinate X0 of the top-left corner of the recognized object, a y-axis coordinate Y0 of the top-left corner of the recognized object, the width of the recognized object, e.g., the length W0 thereof on the x axis, and the height of the recognized object, e.g., the length H0 thereof on the y axis.

Furthermore the currently selected recognized object is determined according to the direction corresponding to the user's operations on a key of the remote controller, and the focus frame of the selected recognized object is plotted according to the obtained positional information of the selected recognized object, which includes: creating an ImageView control for the selected recognized object according to the positional information of the selected recognized object, filling the object focus frame into the ImageView control, and plotting the ImageView control filled with the object focus frame with the object recognition frame of the currently selected object onto the ViewGroup control represented by the second layer.

In this way, the first layer where the screen shot is placed is not refreshed each time a focus is moved in the second layer, and since there is little information in the majority of the second layer, only a small part of a memory is occupied by the second layer even if the second layer is refreshed, thus significantly saving the memory, and improving a response speed of the display device to a selection operation on the user interface.

When the focus frame of the currently selected object is plotted, a focus frame previously plotted at the second layer is deleted so that the focus frame is currently placed at only one position to enable the focus frame to move in real time while the user is operating on the remote controller.

Furthermore, the next selected focus position is obtained as follows while the user is operating on the remote controller: firstly, central coordinates (X, Y) of the other recognized objects are traversed, and the differences in horizontal coordinate or vertical coordinate between central coordinates of the other objects and those central coordinates (X0, Y0) of the currently selected recognized object are calculated as |X−X0| or |Y−Y0|, and the object among the other recognized object with the least difference is selected as the next focus; and if there are two or more recognized objects with the same horizontal or vertical difference, then the distances between the centers of the respective recognized objects, and the center of the current recognized object are further calculated respectively according to the Pythagorean Theorem, and the recognized object with the least difference is selected as the next focus.

In a third operation, after an object recognition interface is started, the display device plots the two-dimension barcode for sharing the screen shot at the third layer, and displays it at the position of the left end of the screen as illustrated in FIG. 6. In this case, for example, when the user presses the Rightward directional key, this layer is moved leftward over some distance, e.g., a distance w, along the x axis in an animated form, and thus slid out of the screen. In the meanwhile, the focus frame is plotted at the position of the leftmost selected object. When the user presses the Leftward directional key, and the current focus frame is already located at the position of the leftmost selected object, the third layer is moved rightward over the same distance w along the coordinates on the x axis in an animated form, and thus presented on the screen, and also the focus frame at the second layer is cleared.

Figure 10:
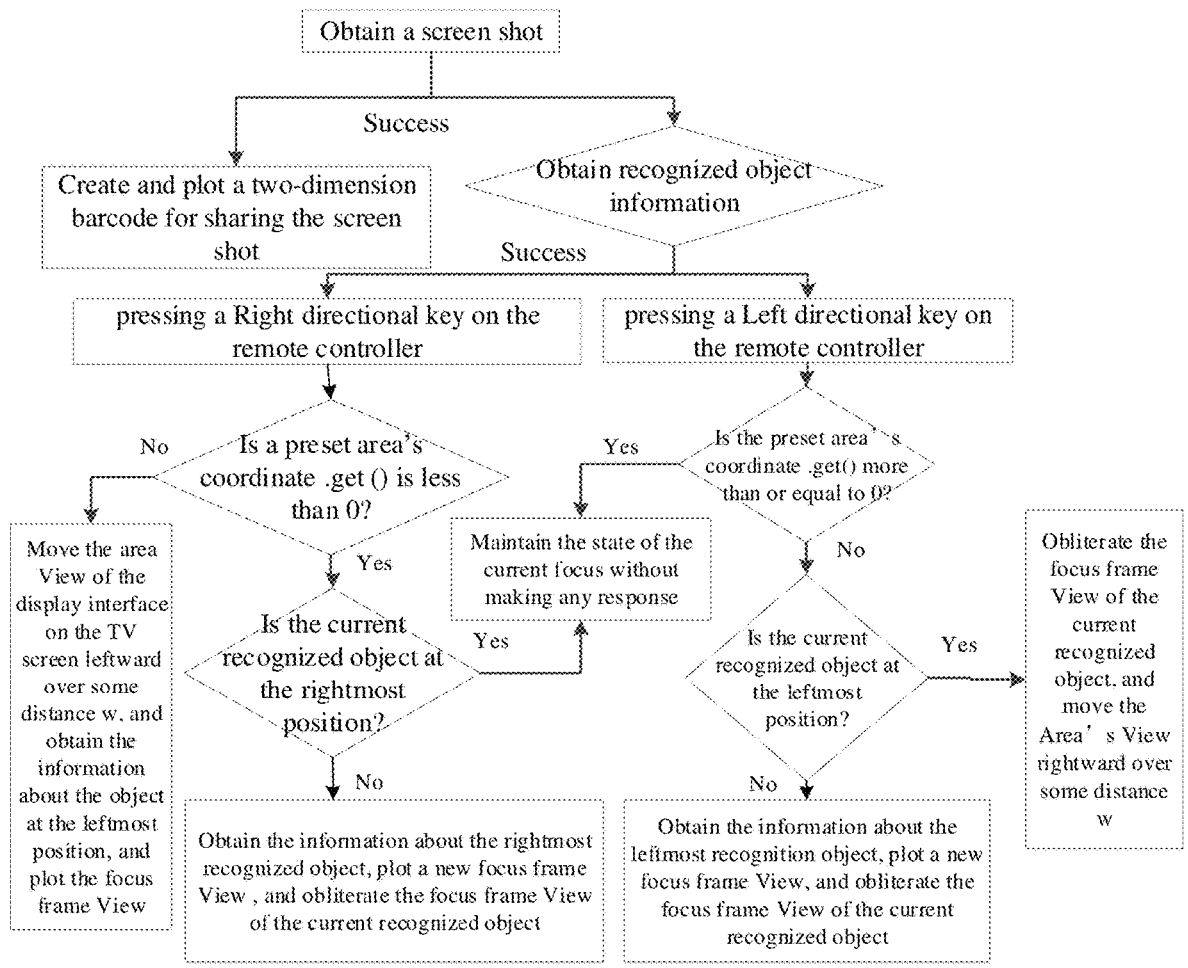
FIG. 10 is a flow chart of interaction via an object recognition interface according to some embodiments of the application.

FIG. 10 illustrates a flow chart of interaction via the object recognition interface according to some embodiments of the application.

(1) After a screen shot is obtained, a two-dimension barcode for sharing the screen shot is created and plotted it at a third layer.

(2) After the screen shot is obtained, a backend server (e.g., an image recognition server, etc.) obtains information about recognized objects. When a user presses a Right directional key on the remote controller and this instruction is received by the display device, the display device determines whether a preset area's coordinate.get ( ) is less than 0 (indicating whether the two-dimensional barcode is on the screen). If not less than 0 (indicating that the two-dimensional barcode is on the screen), the area View of the third layer (the two-dimensional barcode) on the TV screen is moved leftward over some distance w, and the information about the object at the leftmost position is obtained, and the focus frame View is plotted in the second layer according to the positional information thereof. If less than 0 (indicating that the two-dimensional barcode is not on the screen), it is further determined whether the current recognized object is located at the rightmost position. If the current recognized object is located at the rightmost position, the position of the current focus is maintained without making any response; otherwise, the information (such as positions) about the rightmost recognized object is obtained and a new focus frame View is plotted in the second layer according to the positional information thereof, and also the focus frame View of the current recognized object is removed in the second layer.

(3) When the user presses a Left directional key on the remote controller and this instruction is received by the display device, the display device determines whether the preset area's coordinate.get ( ) is less than 0 (indicating whether the two-dimensional barcode is not the screen). If not less than 0 (indicating that the two-dimensional barcode is on the screen), the state of the current focus and the two-dimensional barcode is maintained without making any response, if less than 0 (indicating that the two-dimensional barcode is not on the screen), it is further determined whether the current recognized object is located at the leftmost position, and if so, the focus frame View of the current recognized object is obliterated, and the area's View (the two-dimensional barcode in the second layer) is moved rightward over some distance w (so that it appear on the screen); otherwise, the information (such as positions) about the leftmost recognized object is obtained and a new focus frame View is plotted according to the positional information thereof (next focus frame in the second layer), and also the focus frame View of the current recognized object is obliterated.

FIG. 11 to FIG. 16 illustrate schematic diagrams of an interaction flow according to some embodiments of the application.

Figure 11:
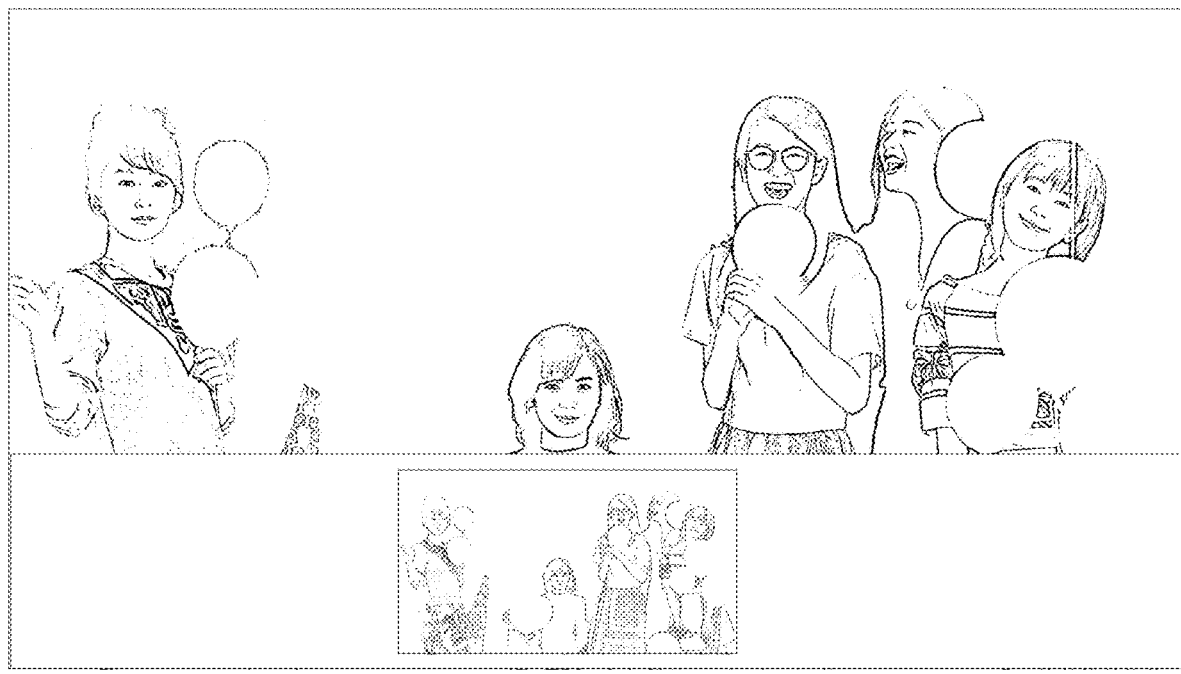
FIG. 11 illustrates a display interface as part of an interaction flow of an example of the solution according to some embodiments of the application.

(1) As illustrated in FIG. 11, a smart image function instruction sent by the user through a shortcut key is received, the screen shot is presented in a part of the user interface displayed on the screen, and a played image is presented in another part of the user interface; and the screen shot is further uploaded to the backend server for object recognition and searching for recommended contents.

(2) As illustrated in FIG. 12, the backend server returns output data, and the display device presents the contents of the output data in categories in accordance with preset rules.

(3) As illustrated in FIG. 13, when the focus frame appears on the screen shot of FIG. 12 and the user presses an activation instruction key on the remote controller to start the object recognition presentation interface in full screen, the third layer (including the pattern of the two-dimension barcode) is displayed over the first and second layers.

Figure 14:
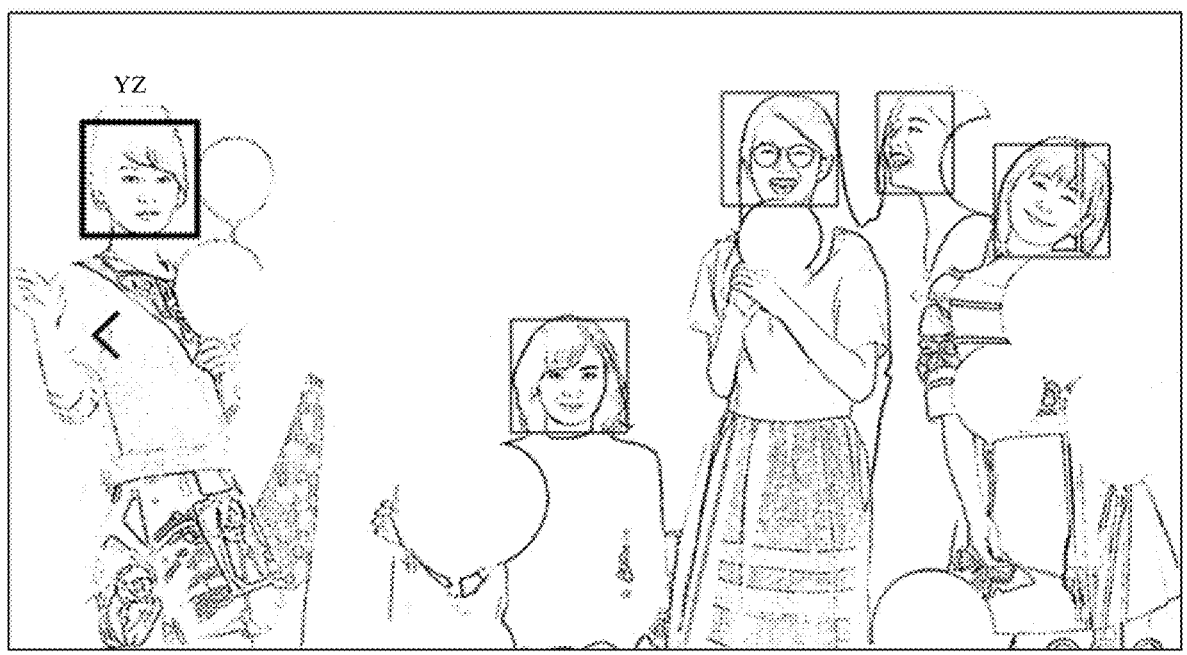
FIG. 14 illustrates a display interface as part of an interaction flow of an example of the solution according to some embodiments of the application.
Figure 15:
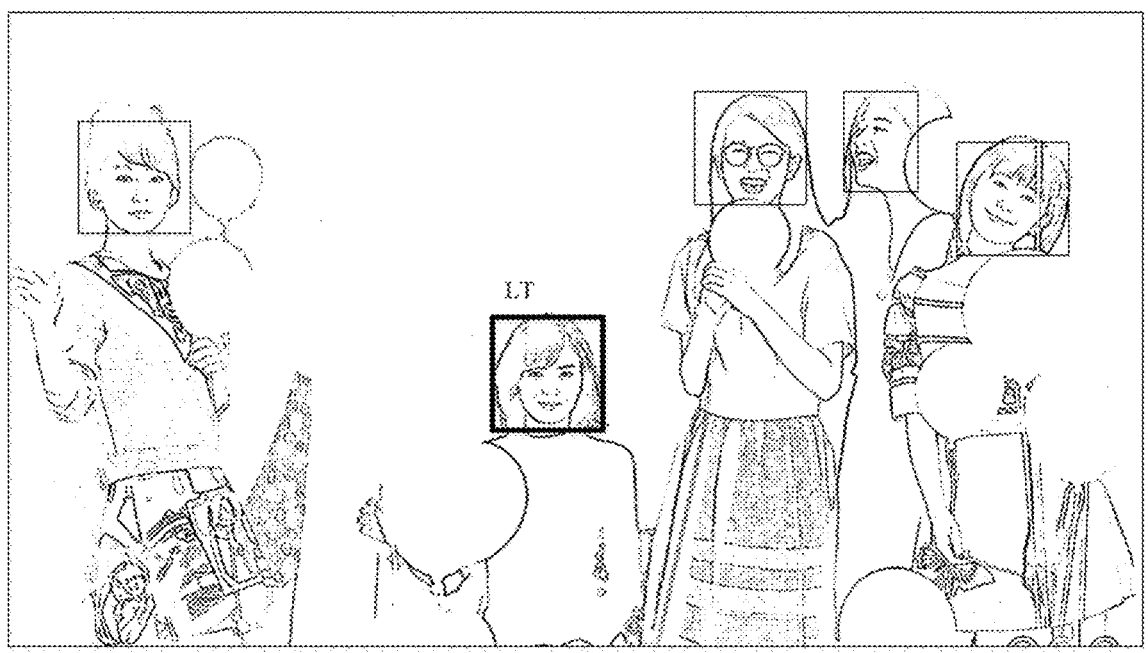
FIG. 15 illustrates a display interface as part of an interaction flow of an example of the solution according to some embodiments of the application.

(4) As illustrated in FIG. 14 and FIG. 15, the user presses on the Right directional key on the remote controller, and the third layer T is moved leftward in an animated form until it is moved out of the screen, that is, the two-dimension barcode fades out of the user interface; and at this time, the focus frame is displayed and plotted on the leftmost recognized object. The user then may further presses the Right directional key, and as described above in the process of moving the object recognition frames and the focus frame, the focus frame is plotted again and positioned on the corresponding recognized object.

Figure 16:
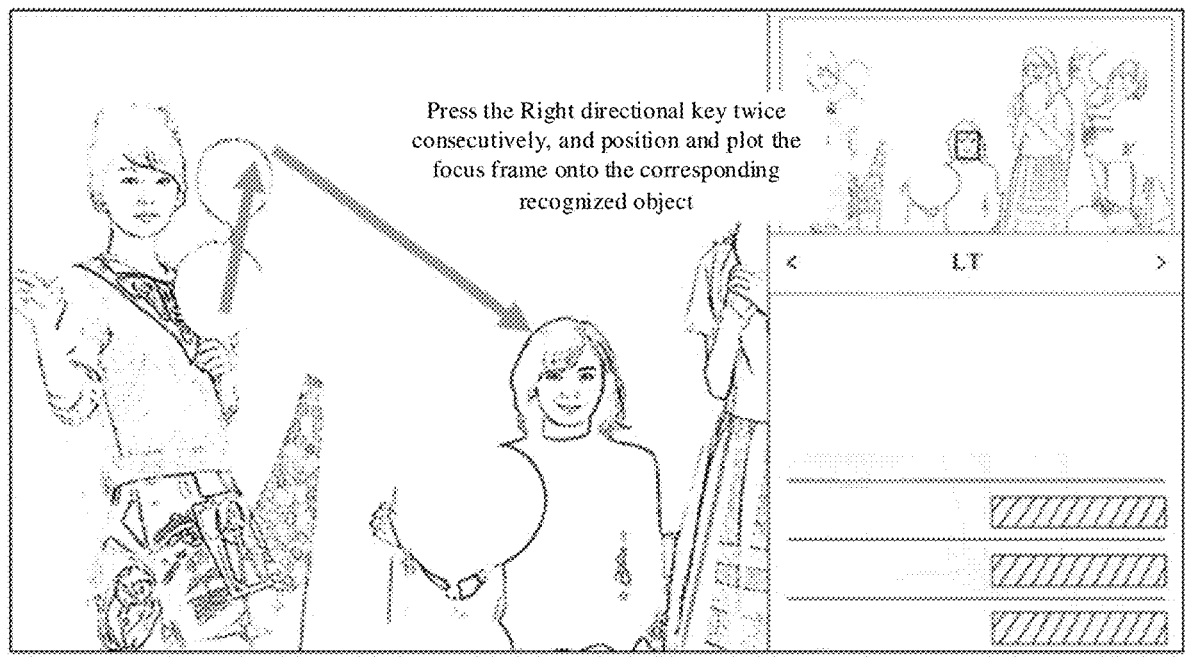
FIG. 16 illustrates a display interface as part of an interaction flow of an example of the solution according to some embodiments of the application.

(5) As illustrated in FIG. 16, the user presses an activation key on the remote controller with the focus frame at the current recognized object to cause the display device to present the recommended information related to the current recognized and focused object.

Figure 17:
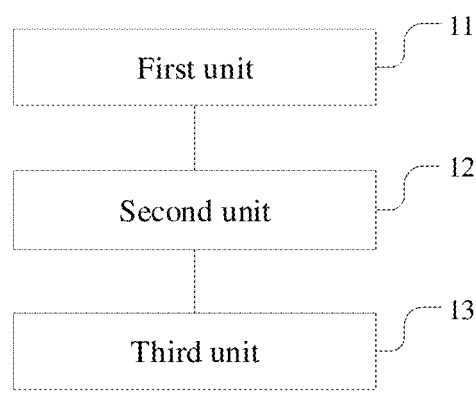
FIG. 17 is a schematic display interface of a display device for displaying a recognized object in a screen shot according to some embodiments of the application.

Accordingly as illustrated in FIG. 17, an apparatus for displaying recognized objects in a screen shot according to some embodiments of the application includes a first unit 11, a second unit 12 and a third unit 13.

The first unit 11 is configured to obtain a screen shot of the current display image on a screen, and to plot the screen shot at a first layer.

The second unit 12 is configured to obtain object recognition information of the screen shot, and to plot object recognition frames at a second layer according to the object recognition information, where the second layer is arranged over the first layer.

The third unit 13 is configured to determine the currently selected object in the screen shot, to cover the object recognition frame of the currently selected object with a focus frame of the currently selected object, and to plot the focus frame and object frames at the second layer.

Figure 18:
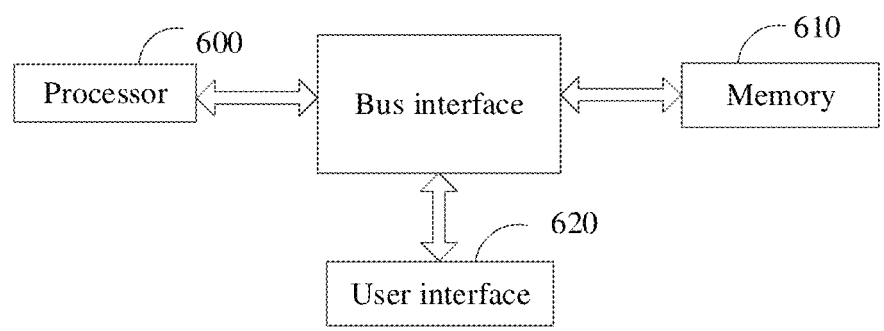
FIG. 18 is a schematic diagram of a display device according to some embodiments of the application.

As illustrated in FIG. 18, some embodiments of the application further provide a display device including a processor 600, a memory 610 and a user interface 620.

The processor 600 is configured to read and execute programs in the memory 610 to cause the display device to: obtain a screen shot of the current display image on a screen, and plot the screen shot at a first layer; obtain object recognition information of the screen shot, and plot object recognition frames at a second layer according to the object recognition information, where the second layer is arranged over the first layer; and determine the currently selected object in the screen shot, cover the object recognition frame of the currently selected object with a focus frame of the currently selected object, and plot the focus frame and the object frames at the second layer.

According to the method described above, a screen shot of the current display image on a screen is obtained, and the screen shot is plotted at a first layer; object recognition information of the screen shot is obtained, and object recognition frames is plotted at a second layer according to the object recognition information, where the second layer is arranged over the first layer; and the currently selected object in the screen shot is determined, the object recognition frame of the currently selected object is overlaid with a focus frame of the currently selected object, and plotted at the second layer, so that a user is provided with a visual focus identification, and real-time operational and interactive feedback to thereby satisfy users' visual needs, reduce a calculation workload, and lower memory consumption.

In FIG. 18, the bus architecture includes any number of interconnecting buses and bridges to particularly link together various circuits including one or more processors represented by the processor 600, and one or more memories represented by the memory 610. The bus architecture further links together various other circuits, e.g., a peripheral device, a power supply circuit, and a power management circuit, etc.

Some embodiments of the application provide a display device, such as a smart TV set, a desktop computer, a portable computer, a smart mobile phone, a tablet computer, etc. The display device may include a Central Processing Unit (CPU), a memory, an input device, an output device, etc., where the input device includes a keyboard, a mouse, a touch panel, etc., and the output device includes a display screen, e.g., a Liquid Crystal Display (LCD), a Cathode Ray Tube (CRT) display, etc.

For different display devices, in some embodiments, the user interface 620 may include an interface via which peripheral devices are connected internally and/or externally as needed, and the connected peripheral devices include but not limited to a keypad, a display, a loudspeaker, a microphone, a joystick, etc.

The processor 600 is responsible for managing the bus architecture and performing normal processes, and the memory 610 stores instructions and data for use by the processor 600 while performing operations.

In some embodiments, the processor 600 is a Central Processing Unit (CPU), an Application Specific Integrated Circuit (ASIC), a Field Programmable Gate Array (FPGA), a Complex Programmable Logic Device ((CPLD), etc.

The memory 610 includes a Read Only Memory (ROM) and a Random Access Memory (RAM), and provides the processor 600 with the program instructions and the data stored in the memory 610. In some embodiments of the application, the memory 610 is configured to store program instructions for performing the method according to any one of the embodiments of the application.

The processor 600 invokes the program instructions stored in the memory 610, and is configured to execute the obtained program instructions to perform the method according to any one of the embodiments of the application.

Some embodiments of the application provide a computer readable non-transitory storage medium configured to store computer program instructions to be executed in the embodiments of the application, where the computer program instructions include programs for performing the method according to any one of the embodiments of the application.

The non-transitory storage medium can be any computer accessible available medium or data storage device including but not limited to a magnetic memory (e.g., a floppy disk, a hard disk, a magnetic tape, a Magnetic-Optical (MO) disk, etc.), an optical memory (e.g., a CD, a DVD, a BD, an HVD, etc.), a semiconductor memory (e.g., an ROM, an EPROM, an EEPROM, a nonvolatile memory (NAND FLASH), a Solid State Disk (SSD), etc.), etc.

The embodiments of the application provide methods and apparatus for displaying a screen shot of a display device, and a display device, so that a user is provided with a visual focus identification of a recognized object in the screen shot, and real-time operational and interactive feedback to thereby satisfy user's visual and operational needs, improve users' experience, reduce calculation workload, and lower memory consumption.

Those of ordinary skill in the art shall appreciate that the embodiments of the application can be implemented as a method, a device, a system, or a computer program product. Furthermore the application can be implemented in the form of a computer program product embodied in one or more non-transitory computer storage mediums (including but not limited to a disk memory, an optical memory, etc.) in which computer program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be implemented as computer program instructions. These computer program instructions can be loaded into a general-purpose computer, a specific-purpose computer, an embedded processor or a processor of another programmable data processing device to produce a machine so that the instructions executed on the computer or the processor of the other programmable data processing device create structures for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including the instructions which perform the functions specified in the flow(s) of the flow chart and/or the block(s) of the block diagram.

These computer program instructions can also be loaded onto the computer or the other programmable data processing device so that a series of operations are performed on the computer or the other programmable data processing devices to create a computer implemented process so that the instructions executed on the computer or the other programmable devices provide operations for performing the functions specified in the flow(s) of the flow chart and/or the block(s) of the block diagram.

Those of ordinary skill in the art can make various modifications and variations to the application without departing from the spirit and scope of the application. Thus the application is also intended to encompass these modifications and variations thereto so long as the modifications and variations fall into the scope of the claims appended to the application and their equivalents.

The invention claimed is:

1. A method for displaying screen shot in a display device, comprising:
   receiving a first input instruction from a user for obtaining screen shot of a display screen of the display device while a display content is being displayed as a first display layer on the display screen;
   in response to the first input instruction:
      capturing a screen shot of an entire content of the first display layer of the display screen; and
      displaying the screen shot and one or more graphic elements associated with one or more recognized objects in the screen shot in a second display layer over the first display layer on the display screen, wherein the screen shot is presented in a first area of the second display layer and the one or more graphic elements are presented in a second area of the second display layer, and wherein an image content in a first graphical element of the one or more graphical elements is the same as an image content of one of the one or more recognized objects in the screen shot;
   receiving a second input instruction from the user for operation on the screen shot;

in response to the second input instruction:
  displaying a two-dimension barcode information associated with the screen shot on the display screen so that the user obtains the screen shot using a separate electronic device by scanning the two-dimension barcode information using the separate electronic device,
    wherein the two-dimension barcode information is displayed in a third display layer over the second display layer;
receiving a third input instruction for operation on the screen shot sent from the user; and
in response to the third input instruction:
  causing the two-dimension barcode information in the third display layer to fade out of the display screen.

2. The method of claim 1, further comprising:
displaying one or more object recognition frames for identifying the one or more recognized objects in the screen shot.

3. The method according to claim 2, further comprising:
in response to a user selection instruction for selecting a first recognized object among the one or more recognized objects, displaying a first object recognition frame as a focus frame visually distinguished from other object recognition frames corresponding to the one or more recognized objects.

4. The method according to claim 3, further comprising:
displaying a magnified image of the first recognized object at a predetermined distance from the focus frame when the first recognized object in the focus frame is smaller than a predetermined size.

5. The method according to claim 1, wherein the first display layer, the second display layer, and the third display layer are independently refreshable.

6. The method according to claim 3, further comprising:
traversing central coordinates of the remaining recognized objects of the one or more recognized objects other than the first recognized object;
calculating differences in horizontal coordinate or vertical coordinate between the central coordinates of the remaining recognized objects and a central coordinate of the first recognized object; and
selecting a second recognizable object among the remaining recognized objects with the least difference in horizontal coordinate or vertical coordinate with the first recognized object as a next recognized object to which the focus frame is to be moved upon receiving a focus-traversing instruction from the user.

7. The method according to claim 6, further comprising:
in response to the least difference in horizontal coordinate or vertical coordinate is associated with both a second recognized object and a third recognized object, calculating distances between the central coordinates of the second recognized object and the third recognized object and the central coordinates of the first recognized object according to Pythagorean Theorem, and selecting a recognized object among the second recognized object and the third recognized object with a shorter distance as the next recognized object to which the focus frame is to be moved upon receiving the focus-traversing instruction from the remote controller.

8. The method of claim 3, further comprising: in response to another selection instruction for selecting a second recognized object among the one or more recognized objects, refreshing the separate display layer to present a second object recognition frame corresponding to the second recognize object as the focus frame.

9. The method of claim 1, wherein the image content in the first graphic element comprises a human character in the screen shot.

10. The method of claim 1, wherein the image content in the first graphic element comprises a facial content.

11. The method of claim 1, wherein the one or more graphic elements are arranged along horizontal direction according to positions of the one or more recognized objects in the screen shot, and are selectable by the user.

12. A display device, comprising:
a display screen;
a memory configured to store computer instructions; and
a processor, in communication with the display screen and the memory, and configured to execute the computer instruction to enable the display device to:
receive a first input instruction from a user for obtaining a screen shot of the display screen of the display device while a display content is being displayed as a first display layer on the display screen;
in response to the first input instruction:
  capture a screen shot of an entire content of the first display layer of the display screen; and
  display the screen shot and one or more graphic elements associated with one or more recognized objects in the screen shot in a second display layer over the first display layer on the display screen,
    wherein the screen shot is presented in a first area of the second display layer and the one or more graphic elements are presented in a second area of the second display layer, and wherein an image content in a graphical element of the one or more graphical elements is the same as an image content of one of the one or more recognized objects in the screenshot;
receive a second input instruction from the user for operation on the screen shot;
in response to the second input instruction:
  display a two-dimension barcode information associated with the screen shot on the display screen so that the user obtains the screen shot using a separate electronic device by scanning the two-dimension barcode information using the separate electronic device,
    wherein the two-dimension barcode information is displayed in a third display layer over the second display layer;
receive a third input instruction for operation on the screen shot sent from the user; and
in response to the third input instruction:
  cause the two-dimension barcode information in the third display layer to fade out of the display screen.

13. The display device according to claim 12, wherein the first display layer, the second display layer, and the third display layer are independently refreshable.

14. The display device according to claim 12, wherein the processor is further configured to execute the computer instructions to:
in response to a user selection instruction for selecting a first recognized object among the one or more recognized objects, displaying a first object recognition frame as a focus frame visually distinguished from other object recognition frames corresponding to the one or more recognized objects.

15. A computer readable non-transitory storage medium, storing computer executable instructions configured, upon being executed by a processor, to perform:

receiving a first input instruction from a user for obtaining a screen shot of a display screen of a display device while a display content is being displayed on the display screen;

in response to the first input instruction:

capturing a screen shot of an entire content of the first display layer of the display screen; and displaying the screen shot and one or more graphic elements associated with one or more recognized objects in the screen shot in a second display layer over the first display layer on the display screen, wherein the screen shot is presented in a first area of the second display layer and the one or more graphic elements are presented in a second area of the second display layer, and wherein an image content in a first graphical element of the one or more graphical elements is the same as an image content of one of the one or more recognized objects in the screen shot;

receiving a second input instruction from the user for operation on the screen shot;

in response to the second input instruction:

displaying a two-dimension barcode information associated with the screen shot on the display screen so that the user obtains the screen shot using a separate electronic device by scanning the two-dimension barcode information using the separate electronic device, wherein the two-dimension barcode information is displayed in a third display layer over the second display layer;

receiving a third input instruction for operation on the screen shot sent from the user; and in response to the third input instruction:

causing the two-dimension barcode information in the third display layer to fade out of the display screen.

\* \* \* \* \*